(12) United States Patent
Chen et al.

(10) Patent No.: US 7,098,796 B2
(45) Date of Patent: Aug. 29, 2006

(54) METHOD AND SYSTEM FOR DETECTING FIRE IN A PREDETERMINED AREA

(75) Inventors: Chao-Ho Chen, Tai-Nan (TW); Cheng-Liang Kao, Tainan Hsien (TW)

(73) Assignee: Huper Laboratories Co., Ltd., Taipei (TW)

( * ) Notice: Subject to any disclaimer, the term of this patent is extended or adjusted under 35 U.S.C. 154(b) by 111 days.

(21) Appl. No.: 10/709,550

(22) Filed: May 13, 2004

(65) Prior Publication Data
US 2005/0253728 A1  Nov. 17, 2005

(51) Int. Cl.
*G08B 17/12* (2006.01)

(52) U.S. Cl. .......... 340/577; 382/100; 382/162

(58) Field of Classification Search .......... 340/577, 340/578; 348/143, 152, 154, 155; 382/100, 382/162, 192
See application file for complete search history.

(56) References Cited

U.S. PATENT DOCUMENTS

| | | | | |
|---|---|---|---|---|
| 5,243,418 A | * | 9/1993 | Kuno et al. ........... 348/155 |
| 5,510,772 A | * | 4/1996 | Lasenby ............... 340/578 |
| 5,726,632 A | * | 3/1998 | Barnes et al. ......... 340/577 |
| 5,937,077 A | * | 8/1999 | Chan et al. ........... 382/100 |
| 6,184,792 B1 | * | 2/2001 | Privalov et al. ....... 340/578 |
| 6,956,485 B1 | * | 10/2005 | Aird et al. ........... 340/577 |
| 2003/0044042 A1 | * | 3/2003 | King et al. ........... 382/100 |
| 2004/0061777 A1 | * | 4/2004 | Sadok ................ 348/83 |

* cited by examiner

*Primary Examiner*—Daniel Wu
*Assistant Examiner*—Travis R. Hunnings
(74) *Attorney, Agent, or Firm*—Winston Hsu

(57) ABSTRACT

A method and system for detecting early fires in a predetermined area includes capturing a plurality of images of the predetermined area during an interval for generating a plurality of difference frames, and detecting a number of pixels that have fire characteristics in each difference frame. If the detection result indicates that the flame of the predetermined area substantially increases during the interval, the method outputs an early fire alarm that can provide more time for firefighting. Thus, both early fire detection and reduction of false fire alarms are achieved.

18 Claims, 44 Drawing Sheets

| Hue | RGB mode | Color Range |
| --- | --- | --- |
| 0°~60° | R ≧ G and G >B | Red to Yellow |
| 60°~120° | G ≧ R and R >B | Yellow to Green |
| 120°~180° | G ≧ B and B >R | Green to Cyan |
| 180°~240° | B ≧ G and G >R | Cyan to Blue |
| 240°~300° | B ≧ R and R >G | Blue to Magenta |
| 300°~360° | R ≧ B and B >G | Magenta to Red |

Fig. 1 Prior Art

METHOD AND SYSTEM FOR DETECTING FIRE IN A PREDETERMINED AREA

BACKGROUND OF INVENTION

1. Field of the Invention

The present invention relates to a method and system for detecting early fires in a predetermined area, and more particularly, to a method and system that can detect if images contain flames and if a flame increases to be a fire.

2. Description of the Prior Art

Generally, a HSI (hue/saturation/intensity) domain is usually utilized for analyzing images, since hue, saturation and intensity can represent all combinations of light to describe color. One prior art method detects if images have flames in the HSI domain. The method includes capturing images in a predetermined area, transforming RGB of each pixel of the images into HSI, and determining if the HSI of each pixel complies with rules in the HSI domain.

In the prior art, the RGB of each pixel is transformed into the HSI by the following equations:

$$I = \frac{1}{3}(R+G+B), 0 \leq I \leq 1 \quad (1)$$

$$S = 1 - \frac{3}{(R+G+B)}[\min(R, G, B)], 0 \leq S \leq 1 \quad (2)$$

$$H = \begin{cases} \theta & \text{if } B \leq G \\ 360 - \theta & \text{if } B > G, \end{cases}$$

$$\theta = \cos^{-1}\left\{\frac{\frac{1}{2}[(R-G)+(R+B)]}{[(R-G)^2+(R-B)(G-B)]^{\frac{1}{2}}}\right\}$$

$$0° \leq H \leq 360° \quad (3)$$

In the prior art, HSI is utilized for analyzing flame. The HSI domain is divided into six regions, as shown in FIG. 1. FIG. 1 is a table of hue, RGB model and color range. The color range of a common fire is from red to yellow; therefore, the hue of fire is from 0 to 60 degrees. Saturation of a fire changes with background illumination. For instance, the color of a fire during the day or under an extra light source has a stronger saturation than that of during the night or having no light source. That is, the color of a fire during the day or with the extra light source displays less white while the color of fire during the night or having no light source displays more white. A fire found in images captured during the night is more white in hue because the fire is the typically the only luminous entity in the images. Additionally, for providing sufficient brightness in video processing, the intensity should be over a threshold. Experimental results according to the prior art show that each HSI pixel of a fire should satisfy the following conditions:

$0° \leq H \leq 60°$      (i)

Brighter environment: $30 \leq S \leq 100$, Darker environment: $20 \leq S \leq 100$      (ii)

$127 \leq I \leq 255$      (iii)

The method mentioned above for detecting fire includes a series of complicated equations to transform RGB into HSI, which requires intensive computations. Besides, the low bound of the saturation condition (ii) may be too small to work correctly and hence it will yield a false fire-detection due to the appearance of reflected flames.

Furthermore, in a fire detecting system, another important function is to generate a fire alarm to prevent a fire accident. The method for generating a fire alarm according to the prior art compares the number of fire pixels to a threshold. If the number of fire pixels in an image is larger than the threshold, a fire alarm is output. However, the method is confined by the distance between the fire and an image capturing device (such as a camera). This enormously increases the false fire alarm rate and thus cannot adequately achieve the purpose of detecting early fires.

For example, suppose that the size of a flame is constant, such as a flame of a candle or a lighter. This kind of flame does not constitute a fire accident; therefore, a fire alarm is not required. Please refer to FIG. 2 to FIG. 5. FIG. 2 and FIG. 4 are diagrams of the same flame 20 of a lighter and an image capturing device 12 separated by different distances. FIG. 2 shows that the flame 20 is far away from the image capturing device 12 and FIG. 4 shows that the flame 20 is near the image capturing device 12. The image capturing device 12 only captures images in a predetermined area. If the distance of the flame 20 and the image capturing device 12 is longer, as d1 shows in FIG. 2, the size of the flame 20 in a frame is much smaller; that is, the number of fire pixels is small, as shown in FIG. 3. On the contrary, if the distance of the flame 20 and the image capturing device 12 is shorter, as d2 shows in FIG. 4, the size of the flame 20 in a frame is much larger; that is, the number of fire pixels is large as shown in FIG. 4. As shown in FIG. 3 and FIG. 5, the flame 20 in FIG. 3 approximately occupies 1.4 squares and the flame 20 in FIG. 5 approximately occupies 14 squares. Suppose that the threshold is 7 squares, the fire alarm is not provided due to the result of FIG. 3 while the fire alarm is provided due to the result of FIG. 5. The same flame 20 of the lighter results in different effects due to the distance of the flame 20 to the image capturing device 12. The result of FIG. 3 does not lead to a false fire alarm, but the result of FIG. 5 does.

In another situation, supposing that the flame spreads out and forms a fire, a fire alarm should be generated. Please refer to FIG. 6 to FIG. 17. FIGS. 6, 8, and 10 show a flame 30 spreading out to be flames 40 and 50, the distance from the image capturing device 12 being d1. FIGS. 7, 9, and 11 show numbers of fire pixels of FIGS. 6, 8, and 10, respectively. FIGS. 12, 14, and 16 show a flame 30 spreading out to be flames 40 and 50, the distance from the image capturing device 12 being the shorter d2. FIGS. 13, 15, and 17 show numbers of fire pixels of FIGS. 12, 14, and 16, respectively. The image capturing device 12 only captures images in a predetermined area. If the distance between the flames 30, 40, and 50 and the image capturing device 12 is d1, the sizes of the flame 30, 40, and 50 in a frame are much smaller; that is, the numbers of fire pixels are small, as shown in FIGS. 7, 9, and 11. On the contrary, if the distance between the flames 30, 40, and 50 and the image capturing device 12 is d2, the sizes of the flame 30, 40, and 50 in a frame are much larger; that is, the numbers of fire pixels are large, as shown in FIGS. 13, 15, and 17. Suppose that the fire alarm is given if the number of fire pixels reaches 15. Although the flame 30 has spread to be the flame 50 thereby causing a fire accident, the fire alarm is not generated due to the result of FIG. 11 so occupants are not alerted to escape from the fire accident. Because the distance between the image capturing device 12 and the scene of the fire is longer, the image capturing device 12 has no ability to detect that the fire exists. Although the fire alarm is correctly provided due to the result of FIG. 17, this is only because the distance between the image capturing device 12 and the flame 50 is just right. In the prior art, the position of the fire cannot be detected in a real environment. The image capturing device 12 cannot accurately detect if a fire is formed. Therefore, the fire alarm cannot be efficiently provided to prevent a fire accident.

SUMMARY OF INVENTION

It is therefore a primary objective of the claimed invention to provide a method for detecting early fires in a predetermined area to solve the above-mentioned problem.

The claimed invention includes capturing a plurality of images in a predetermined area for generating a plurality of difference frames during an interval, detecting a number of pixels that have fire characteristics in each difference frame, and if the detection result indicates that the flame of the predetermined area substantially increases during the interval, outputting an early fire alarm.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 1 is a table of hue, RGB model, and color range.

DETAILED DESCRIPTION

In order to shed light on the present invention, the first discussion relates how to detect fire pixels of frames, and the second discussion relates how to detect a flame increasing to become a fire. Finally, the best embodiment of detecting early fires, which combines the first method with the second method, is disclosed.

To provide less-computational fire-detecting rules and overcome the problem of small low-bound in condition (ii) described previously, we develop a more cost-effective and reliable fire-detection strategy. Two basic ideas behind the proposed technique are based on direct processing with RGB model and solving the problem of the reflected flames. As mentioned above, the color range of a common fire is from red to yellow. From the table in FIG. 1, the relation of R, G, and B is $R \geq G > B$. If the RGB value of a pixel complies with the rule, the pixel may be a fire pixel. Then, other detections are required to be performed for the pixel.

Because fire is a light source, the image capturing device needs sufficient brightness to capture useful image sequences. From the color of fire, R is the maximum of R, G, and B and is thus the major component. There should be a stronger R in a fire image. Hence, the value of the R component should be over a threshold, Rt, which is obtained from the results of experiments. However, background illumination can affect the saturation of flames or generate a false appearance of flame so that false fire detection occurs. To prevent such a mistake caused by the background illumination, the saturation of flames must satisfy a determined equation to eliminate the false appearance of flame. The determined equation is also obtained from the result of experiments. Based on the explanation above, the rules are described as follows:

rule 1: $R > Rt$
rule 2: $R \geq G > B$
rule 3: IF $(S \geq (S \geq ((255-R)*St/Rt))$
fire pixel
ELSE
not fire pixel
S is simplified by rule 2, $$S = 1 - \frac{3B}{(R+G+B)},$$

$0 \leq S \leq 1$

In rule 3, when the value of the red component of a pixel is Rt, the saturation of the pixel is St. St and Rt are obtained from a great number of experiment values. Both St and Rt are affected by the background illumination, such as that during the day or the night. Therefore, St and Rt change with the environment. In rule 3, when R increases up to the value 255, the result should be zero. That is, S of fire pixels increases with R increasing while the result of rule 3 decreases.

Figure 2:
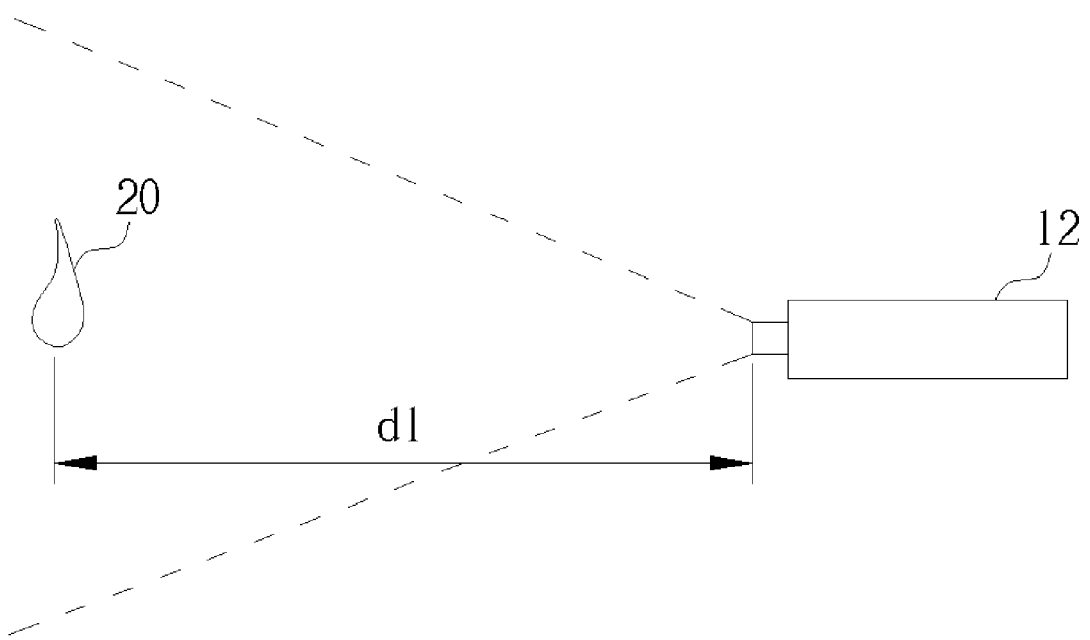
FIG. 2 to FIG. 17 show the detection of early fires and the numbers of fire pixels according to the prior art.
Figure 3:
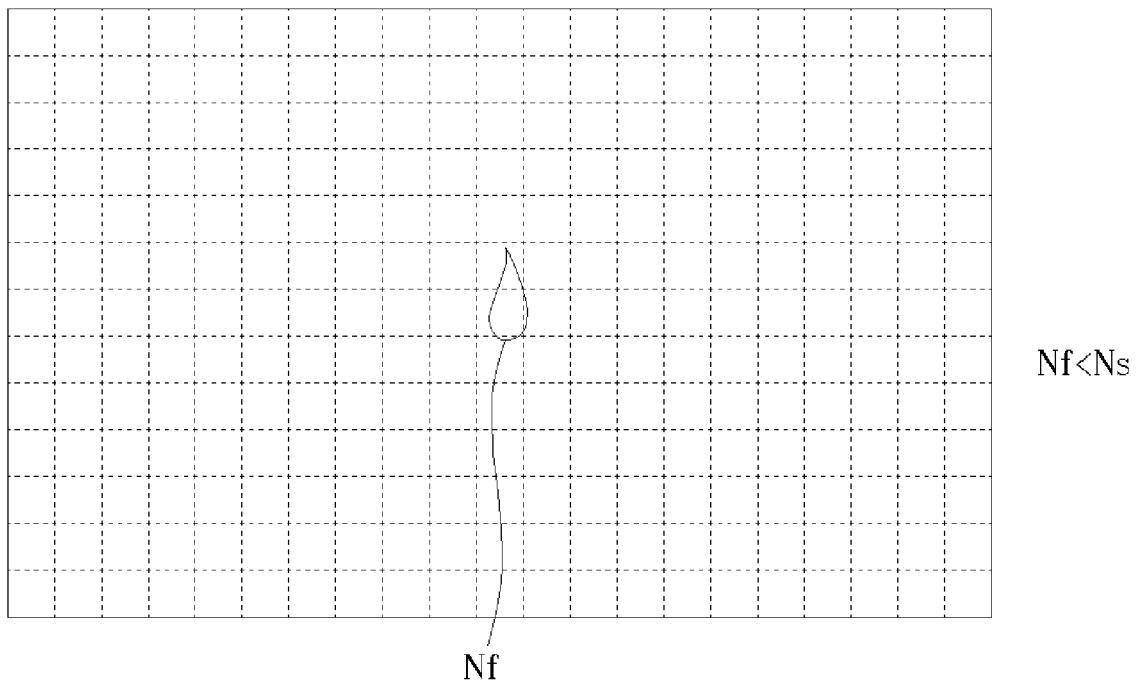
Figure 4:
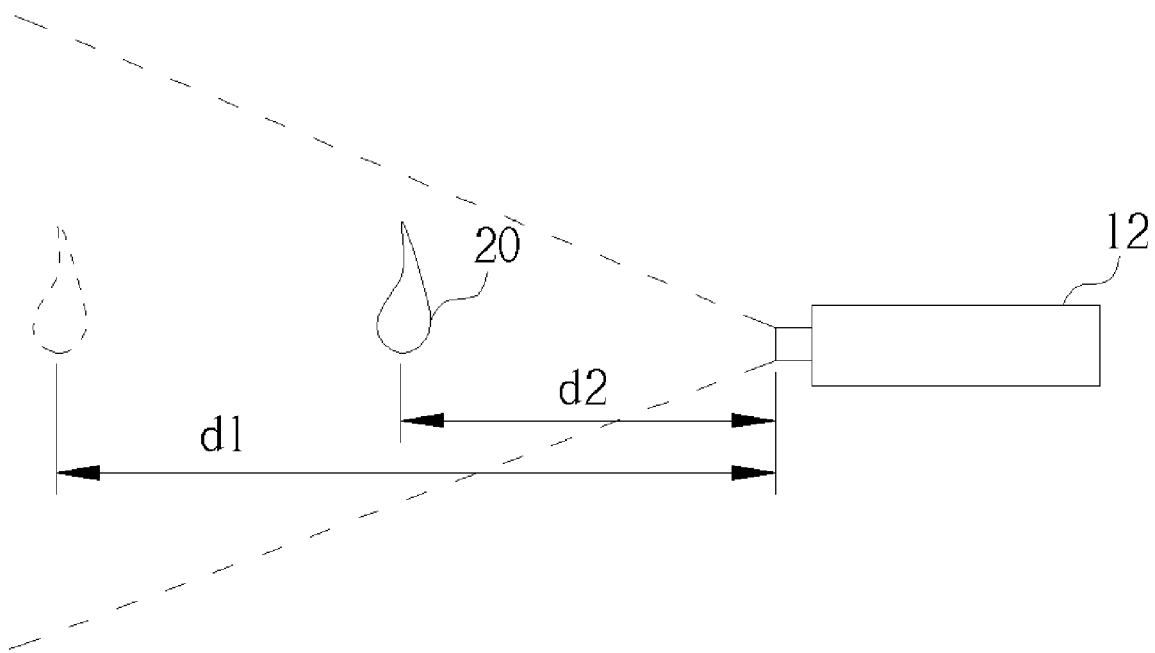
Figure 5:
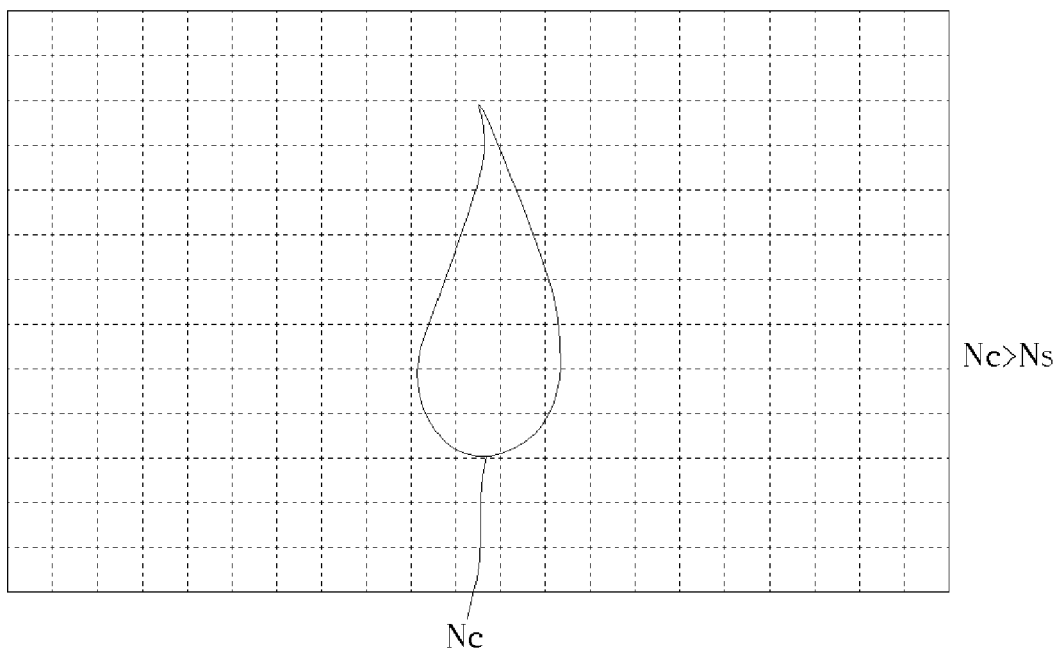
Figure 6:
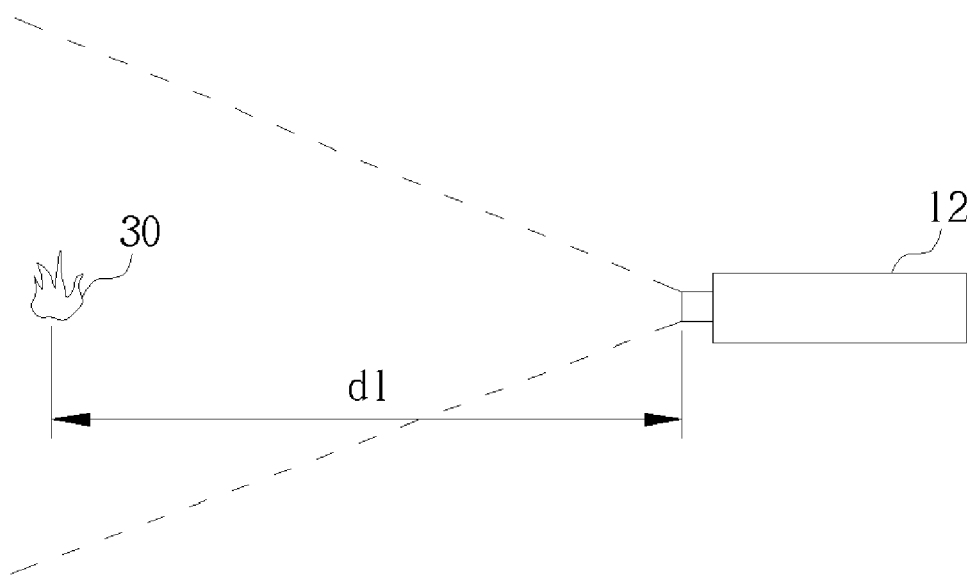
Figure 7:
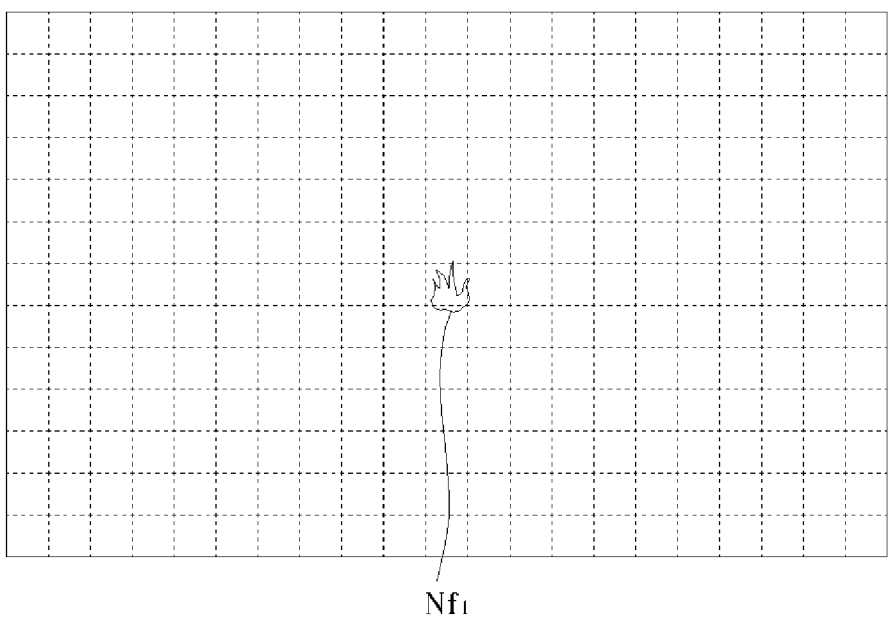
Figure 8:
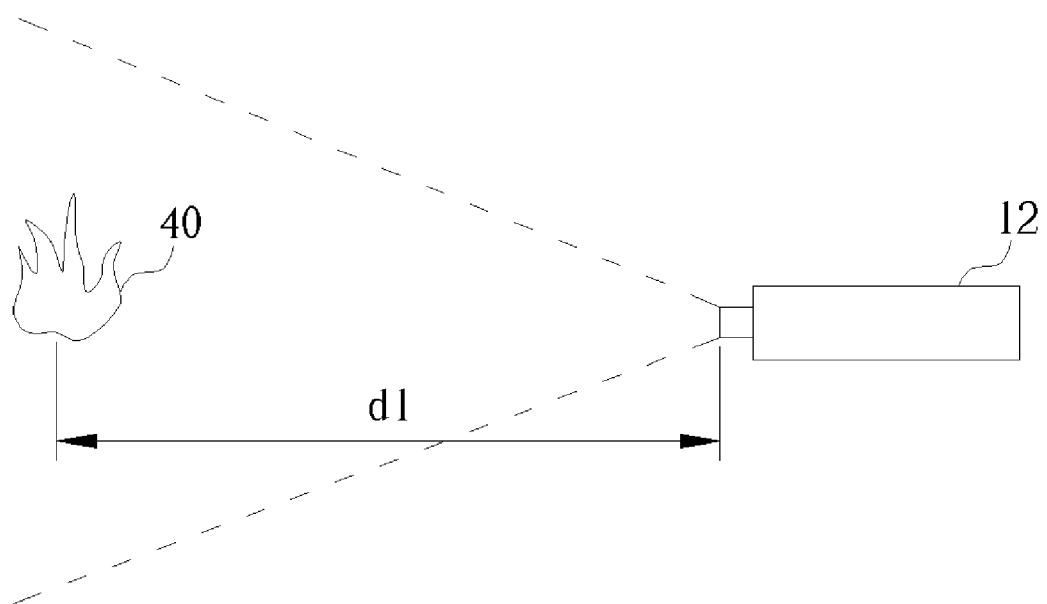
Figure 9:
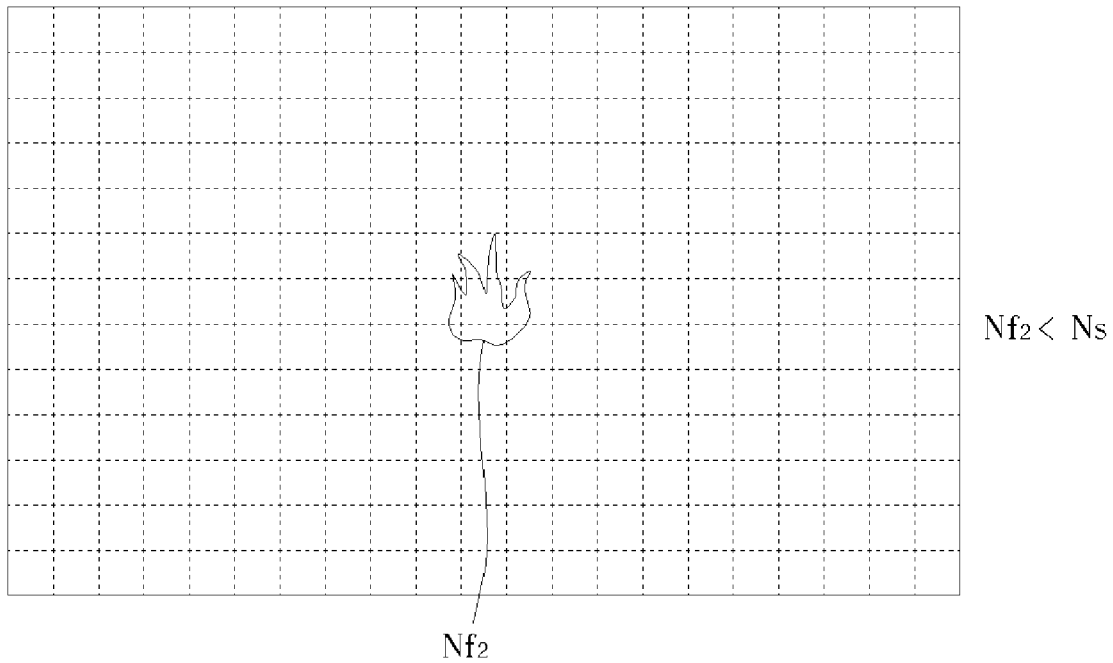
Figure 10:
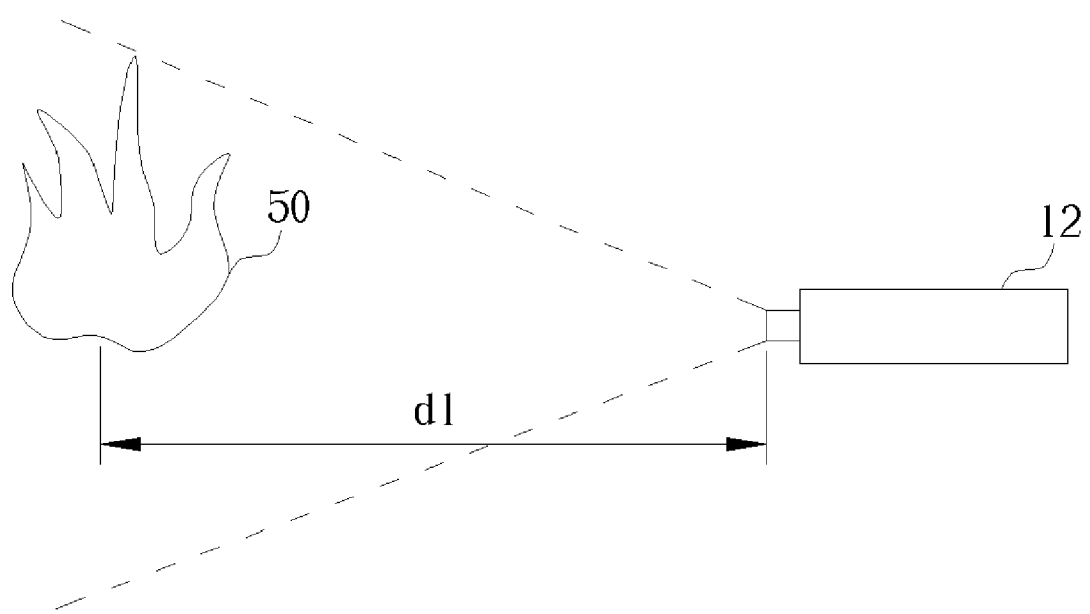
Figure 11:
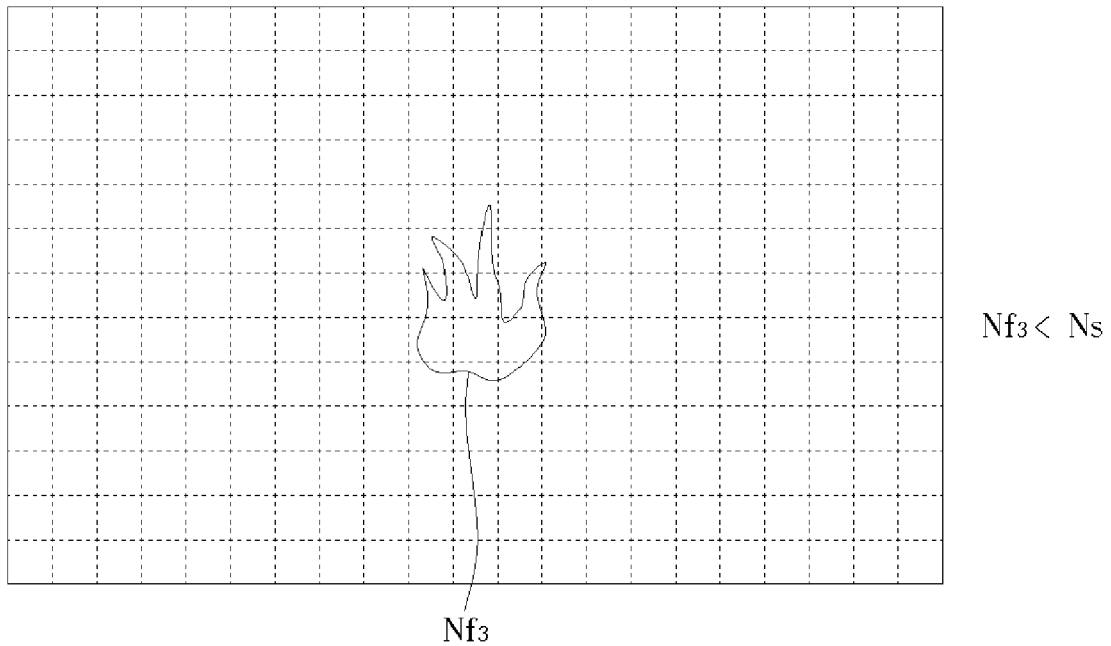
Figure 12:
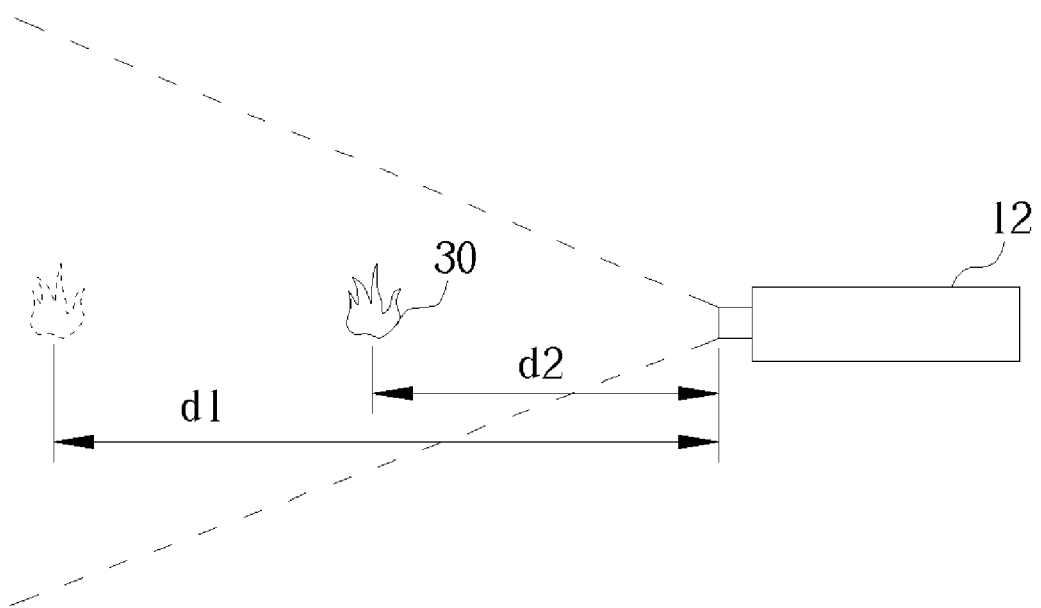
Figure 13:
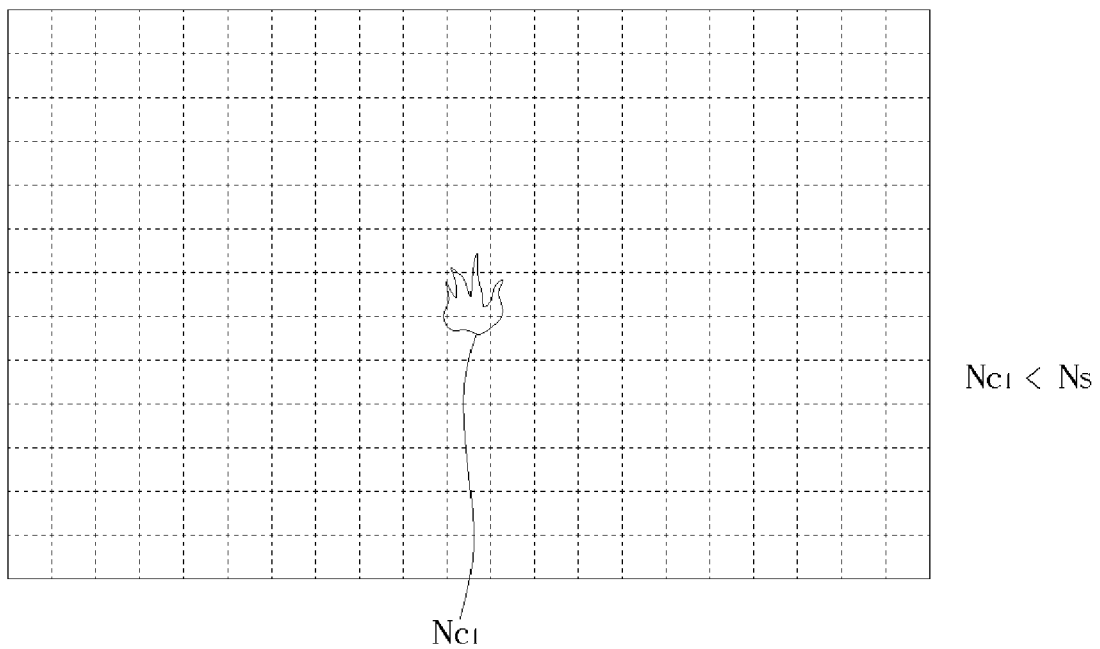
Figure 14:
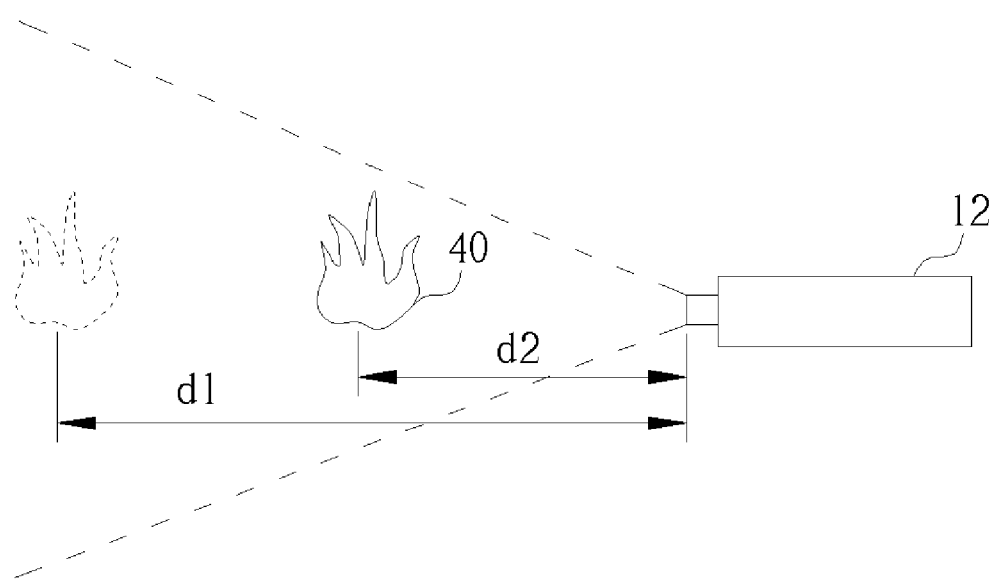
Figure 15:
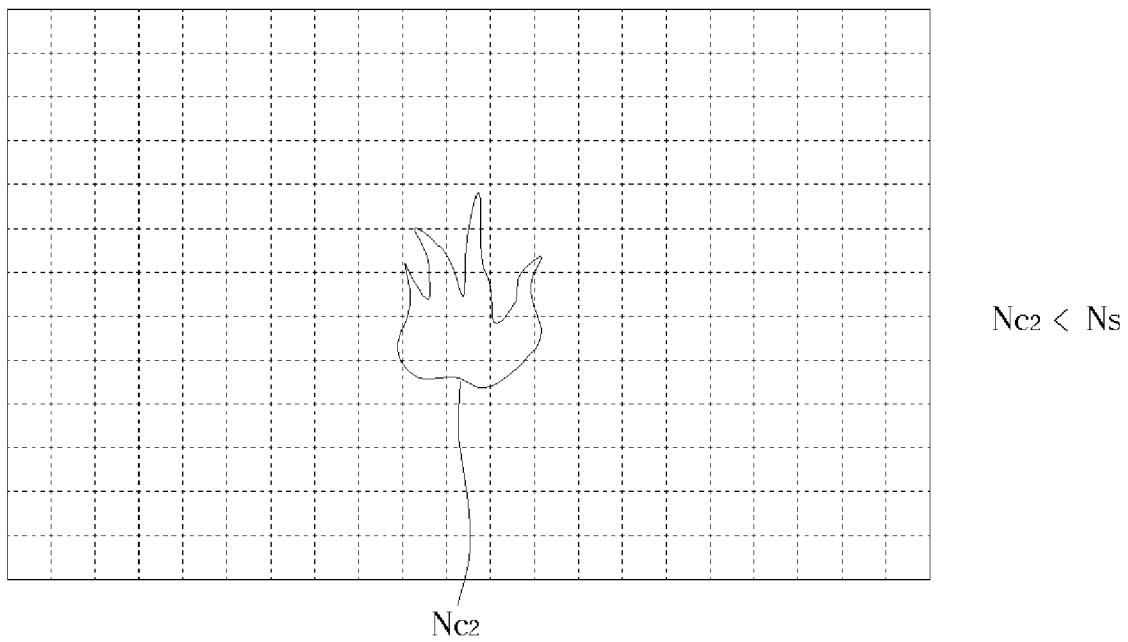
Figure 16:
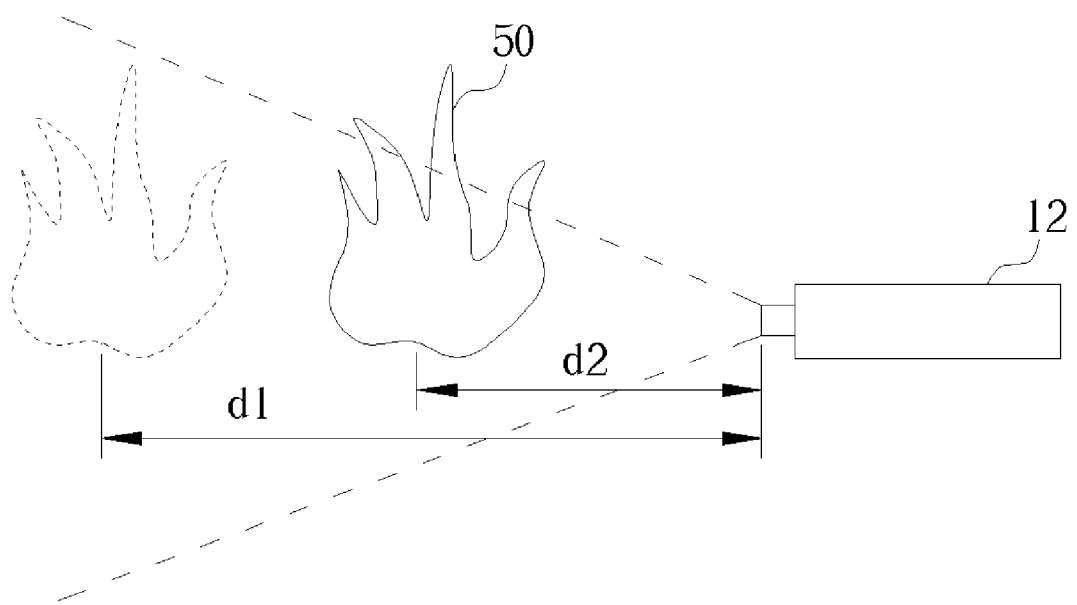
Figure 17:
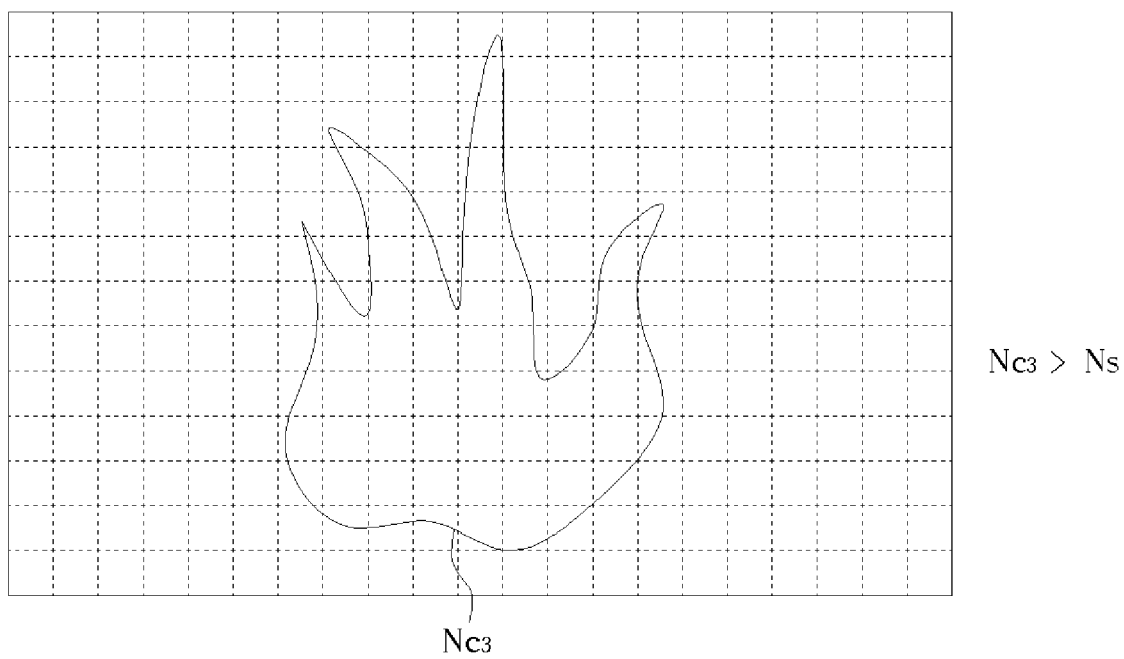
Figure 18:
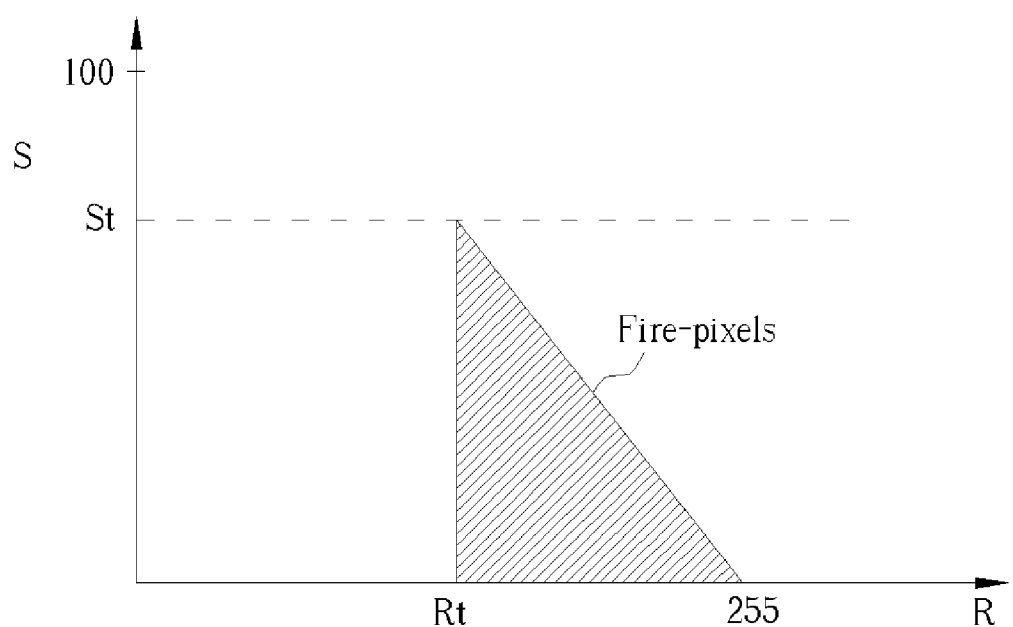
FIG. 18 is a graph of red component R versus saturation S.

Please refer to FIG. 18. FIG. 18 is a graph of R versus S, obtained from many experiments. The background illumination during the day is brighter; thus, R is smaller and S is larger. Conversely, the background illumination during the night is darker; thus, R is larger and S is smaller. The range of Rt is from 100 to 150 and the range of corresponding S is from 70 to 50, both obtained from experiments. These two ranges are suitable for detecting flames in both conditions, the day and the night.

Detecting flames by the three rules only requires calculating S according to RGB instead of transforming RGB into HSI. Also, the present invention reduces a lot of calculation by directly utilizing RGB for detecting if pixels captured are fire pixels.

In addition, the color range of flames is from red to yellow and R is the maximum of components R, G, and B of a fire pixel, as shown in FIG. 1. Therefore, the basis of a flame is the R component. Thus, the present invention utilizes R as the basis for detecting flames. For instance, R must be over a threshold, Rt, and satisfy the relation $R \geq G > B$. Finally, in order to reduce the effect of the background illumination, S must be over a result of an equation, rule 3. In the prior art, intensity I is an average of R, G, and B, as shown in equation (1), and G and B are considered in intensity I. Therefore, the prior art cannot accurately detect fire characteristics. Hence, the three rules of the present invention are more accurate than the prior art.

The next discussion relates how to detect if a flame is increasing to be a fire. After detecting flames by the three rules, the number of fire pixels of each image can be calculated. Repeats of capturing images and recording the number of fire pixels of each image are required for the detection. Capturing K images and determining if the number of fire pixels increases over P %*K times indicates whether a flame is spreading out to become a fire, and if a fire alarm should be generated.

For instance, suppose that K is 100 and P is 70. After capturing 100 images and calculating the numbers of fire pixels of each image, the number of fire pixels is compared between sequential images. If the number of fire pixels in a latter image is larger than that in a former image, the number of fire pixels has increased. In other words, the number of fire pixels of the i-th image is compared to that of the i+1-th image, and the number of fire pixels of the i+1-th image is compared to that of the i+2-th image, and so on. If the number of fire pixels increases over 70 (K*P %=100*70%=70) times, the flame is detected as spreading out to become a fire and a fire alarm should be generated.

Figure 19:
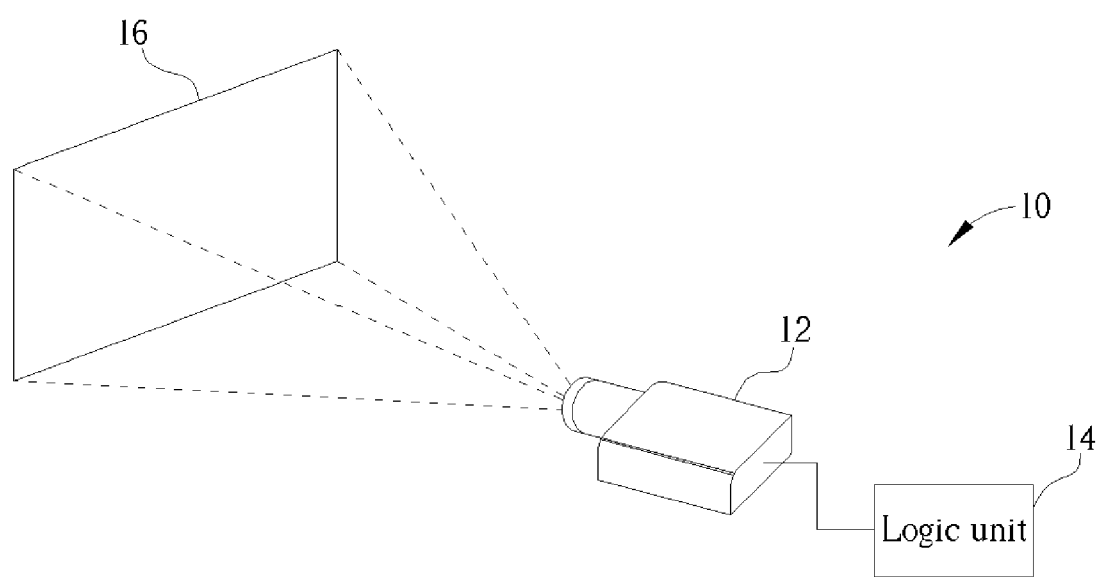
FIG. 19 is a diagram of a video detecting system.

The methods mentioned above are carried out in a fire detection system. Please refer to FIG. 19. FIG. 19 is a diagram of the video detecting system 10 of the present invention. The image capturing device 12 is utilized for capturing images. A logic unit 14 controls the image capturing device 12 to capture a plurality of images 16 in a predetermined area during an interval for generating a plurality of difference frames, detects a number of fire pixels in each difference frame, and outputs a fire alarm if the detection result indicates that the flame of the predetermined area substantially increases during the interval.

Figure 20:
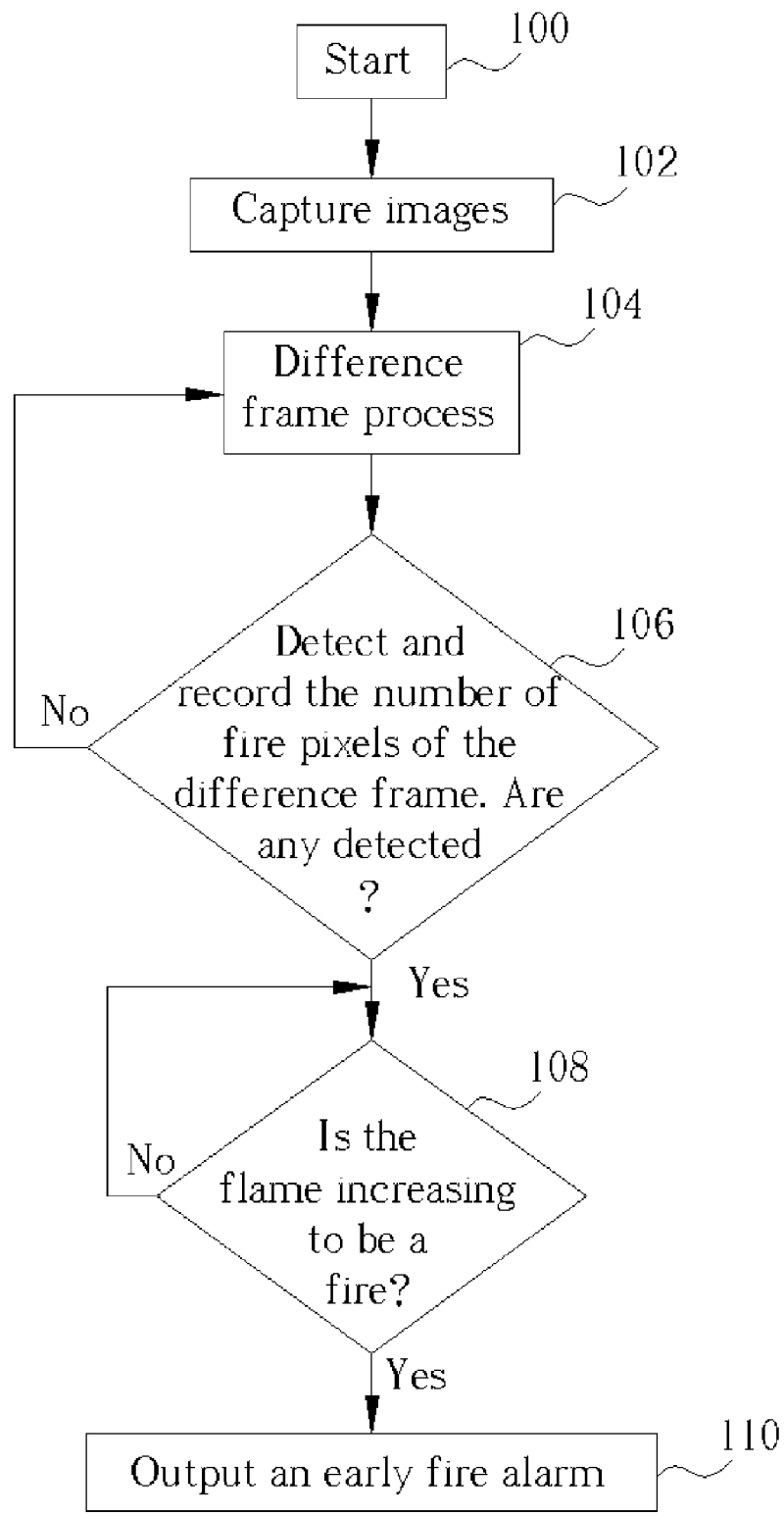
FIG. 20 is a flowchart of detecting early fires according to the present invention.

FIG. 20 is a flowchart of detecting early fires according to the present invention. The steps are as follows:

Step 100: start the fire detection system.

Step 102: the image capturing device 12 captures a plurality of images and a background image.

Step 104: detect if there is a difference between the background image and the current image; that is, perform a difference frame process. The differences between the images captured by the image capturing device 12 and the background image are retained and noise of the differences is removed for generating a plurality of difference frames. The difference between the current image and the background image is detected by the difference frame process.

Step 106: detect if each pixel is a fire pixel by the three rules and record the numbers in each difference frame. If at least one of pixels is a fire pixel, go to step 108. Otherwise, if no pixel has fire characteristics, re-detect the difference between the background image and the images captured by the image capturing device 12 and go to step 104.

Step 108: detect if the flame increases to be a fire according to the numbers of fire pixels of difference frames. If yes, go to step 110. If no, stay in step 108. Because pixels of difference frames are detected to be fire pixels, the flame is still small at this time. Therefore, continuously detect if the flame increases to be a fire.

Step 110: if the number of fire pixels increases over K*P % times, it indioates that the flame spreads out to be a fire and a fire alarm should be generated.

The present invention can reduce the calculations required and efficiently reduce the false fire alarm rate while preventing fire accidents.

As mentioned above, the prior art is confined by the distance of the flame and the image capturing device so that the false fire alarm rate increases. The present invention can efficiently reduce the false fire alarm rate.

Figure 21:
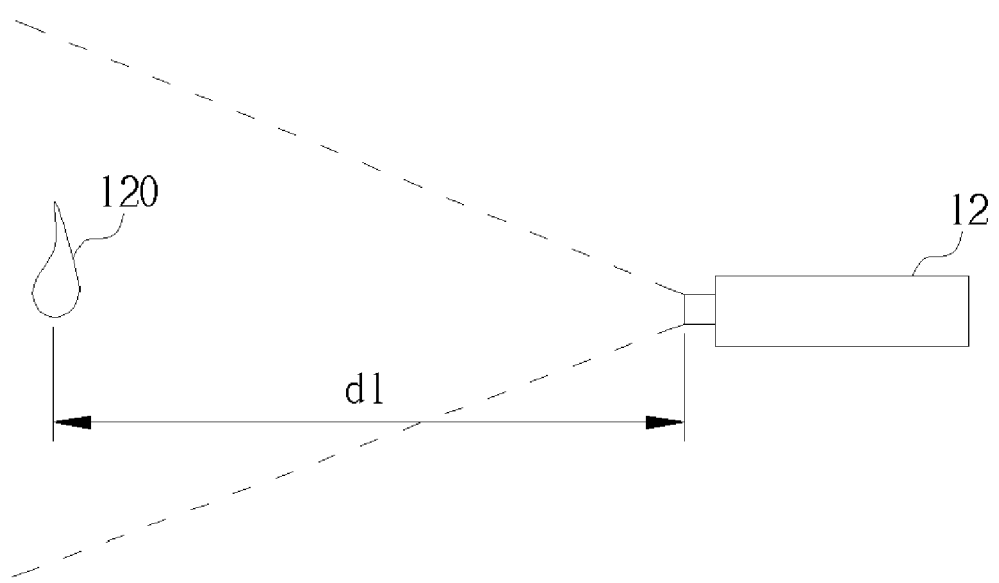
FIG. 21 to FIG. 44 show the detection of early fires and the numbers of fire pixels according to the present invention.
Figure 22:
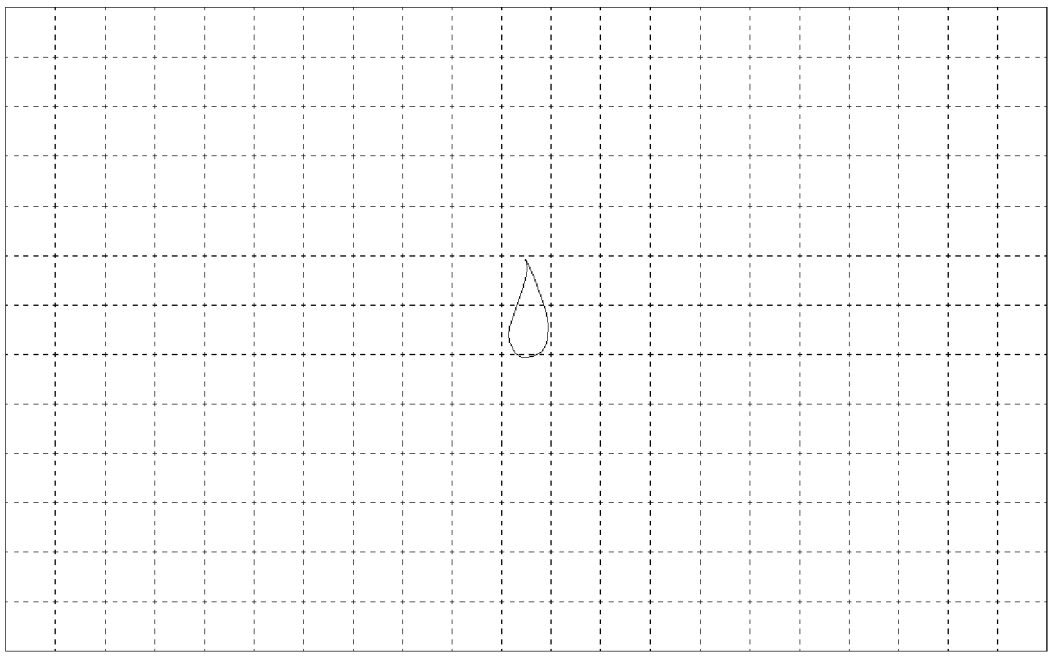
Figure 23:
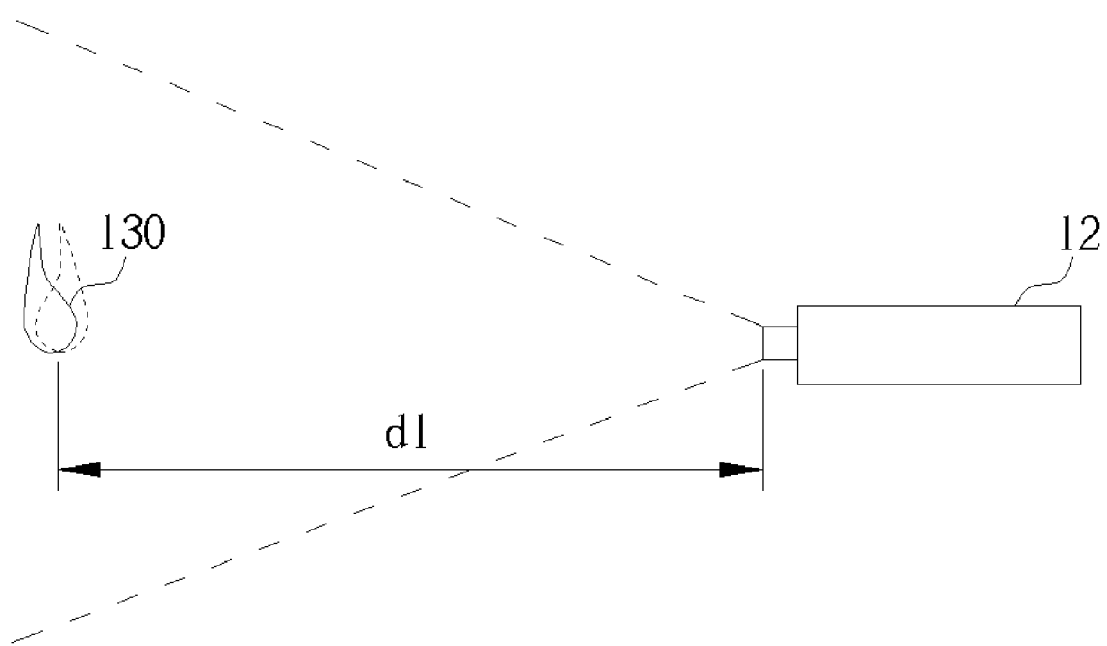
Figure 24:
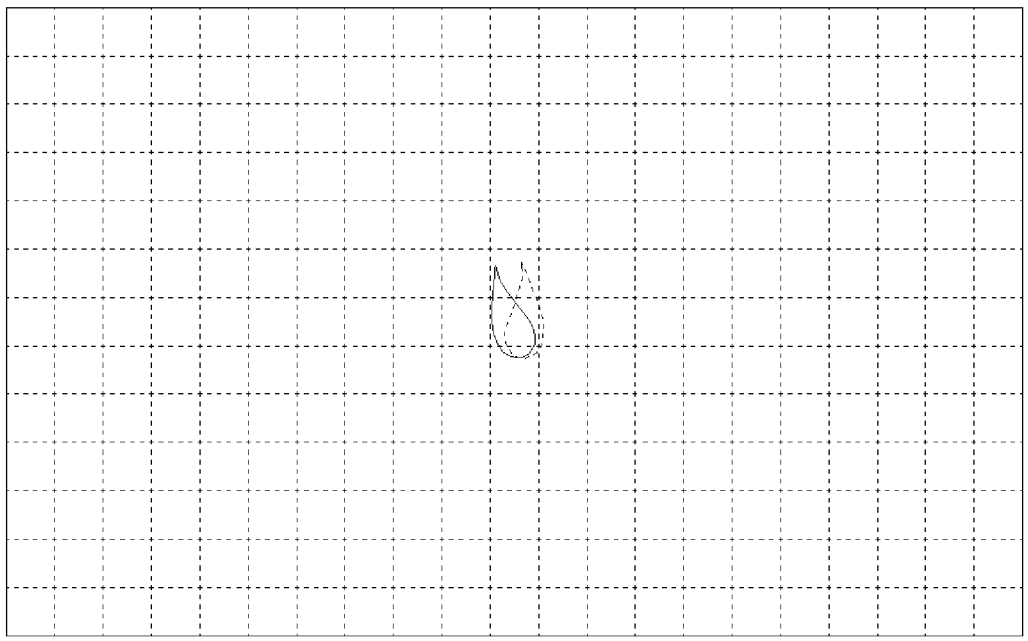
Figure 25:
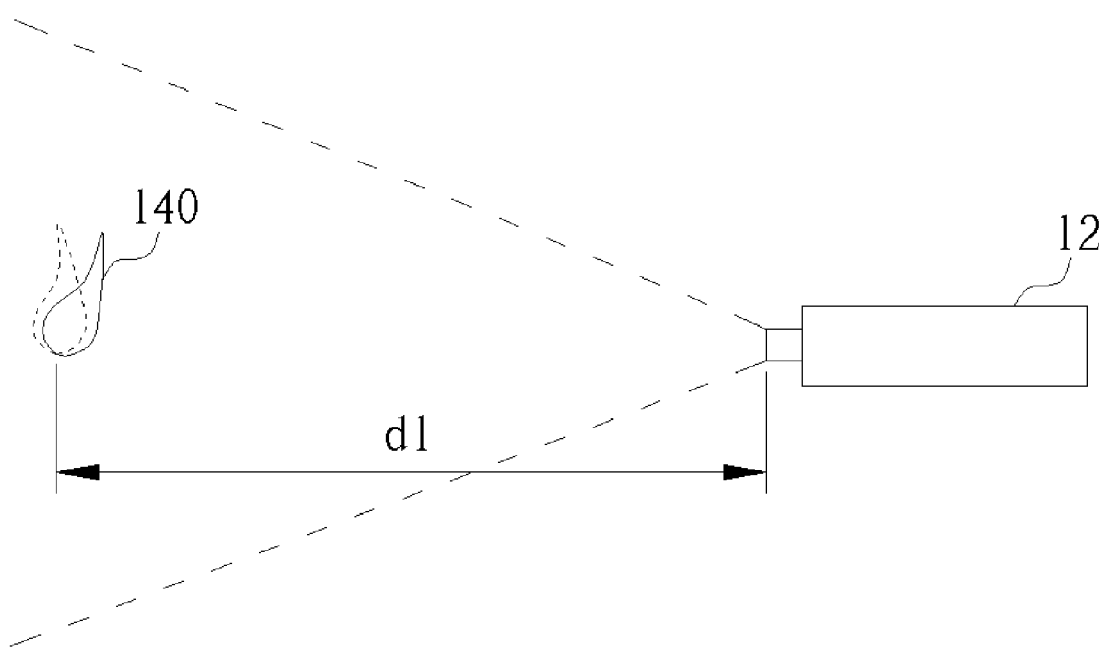
Figure 26:
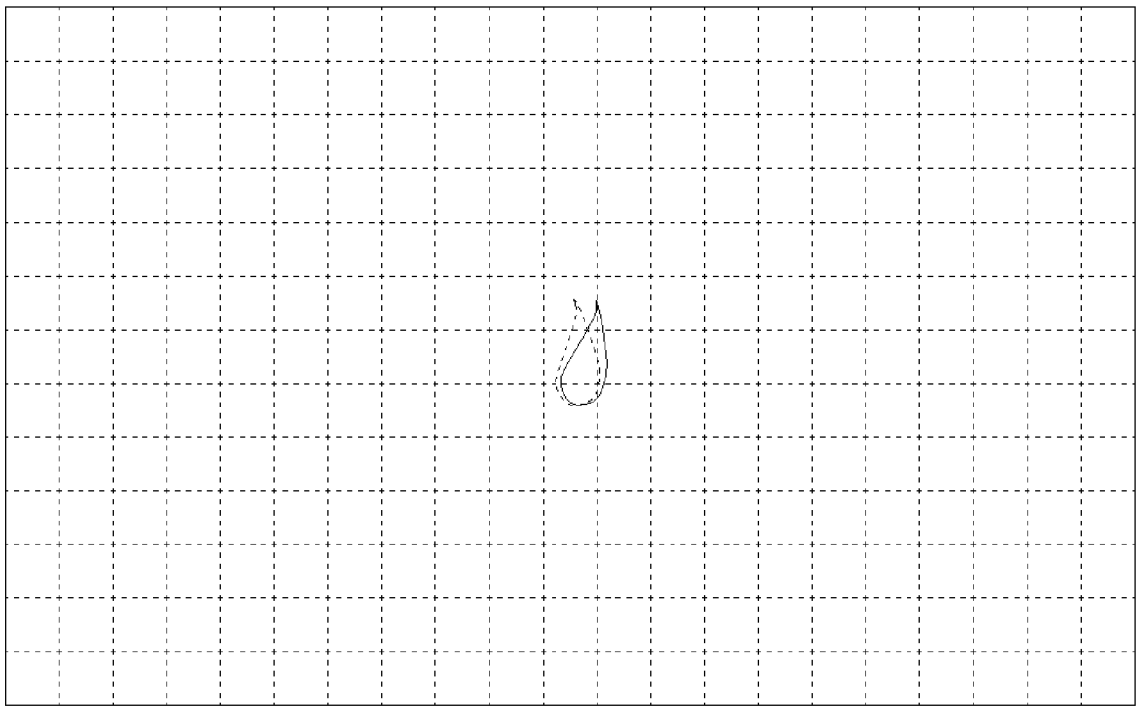
Figure 27:
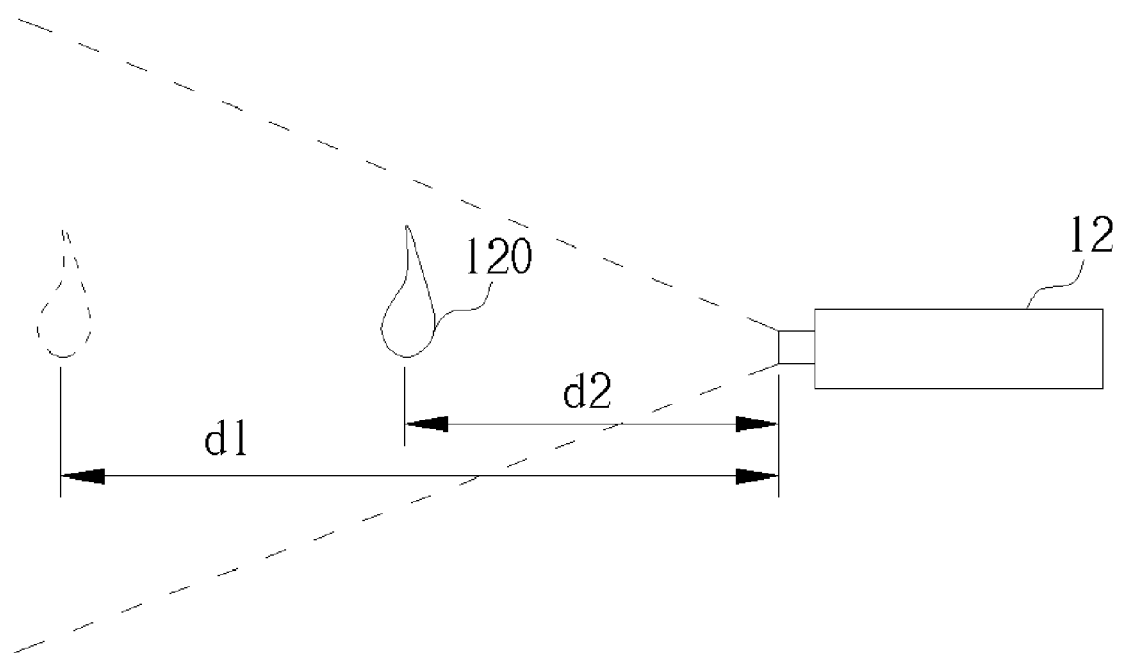
Figure 28:
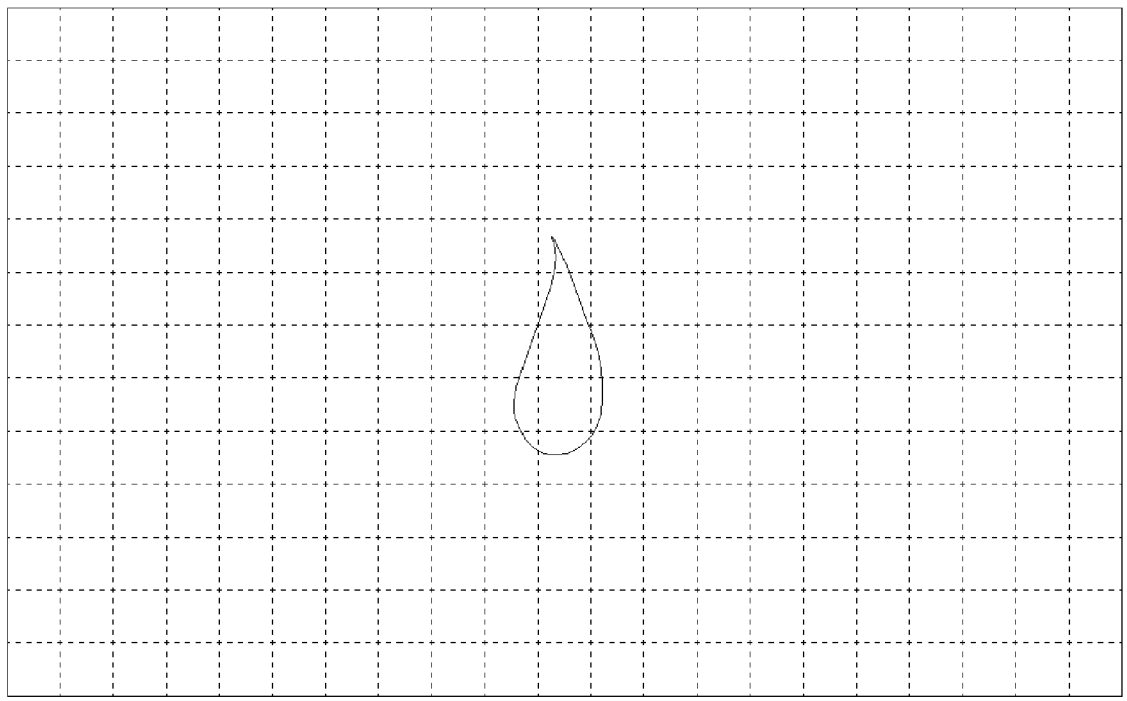
Figure 29:
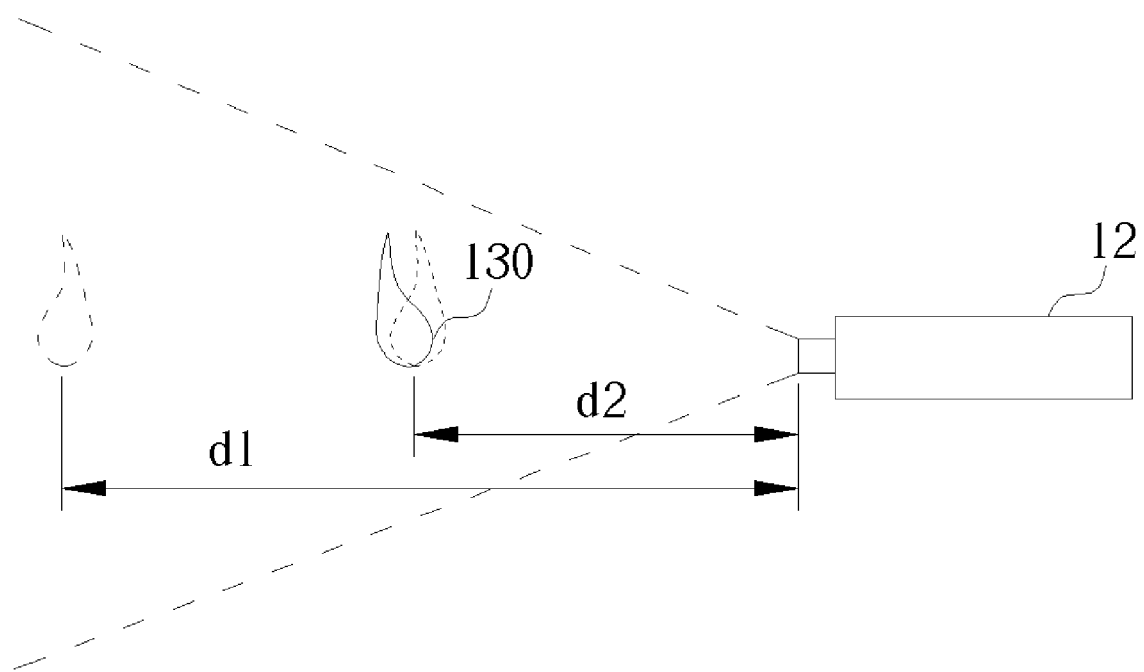
Figure 30:
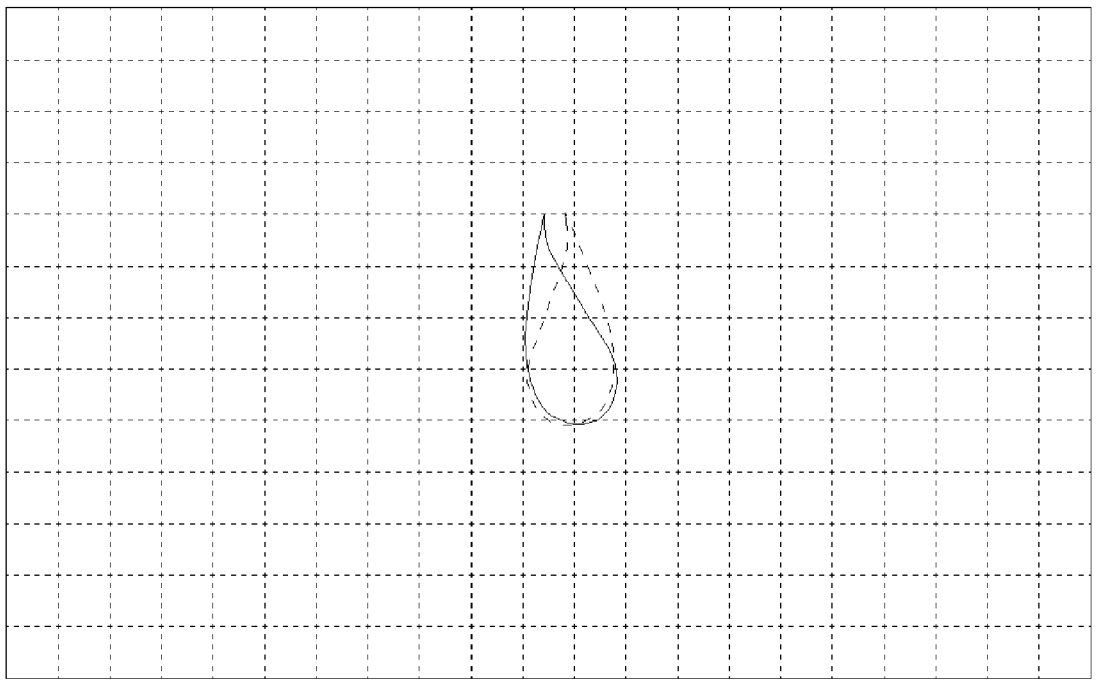
Figure 31:
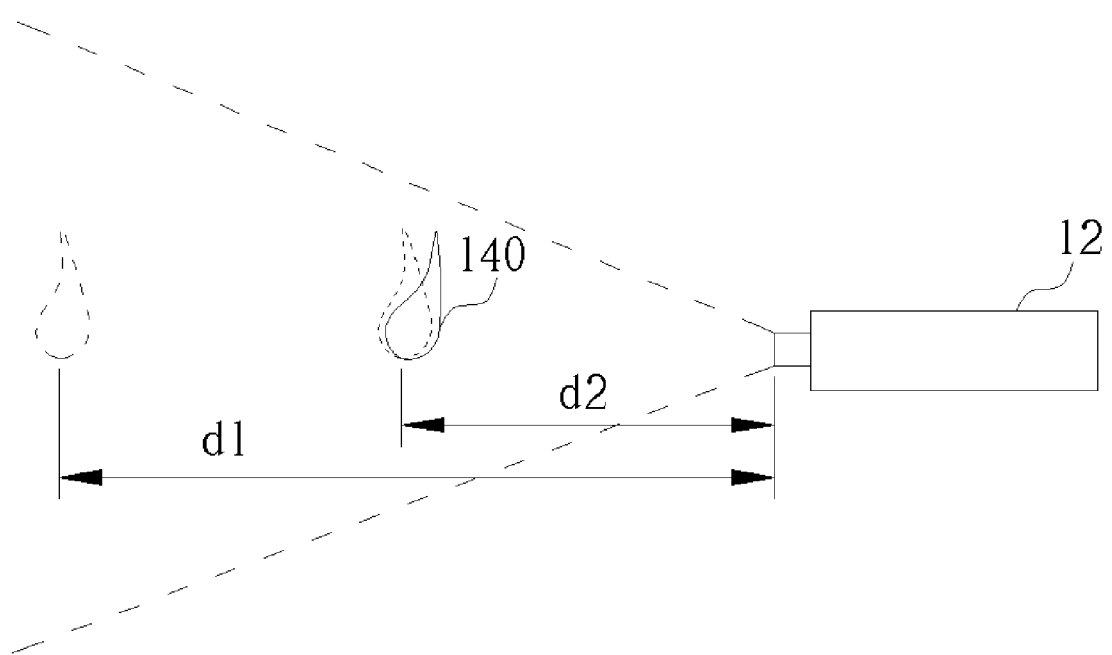
Figure 32:
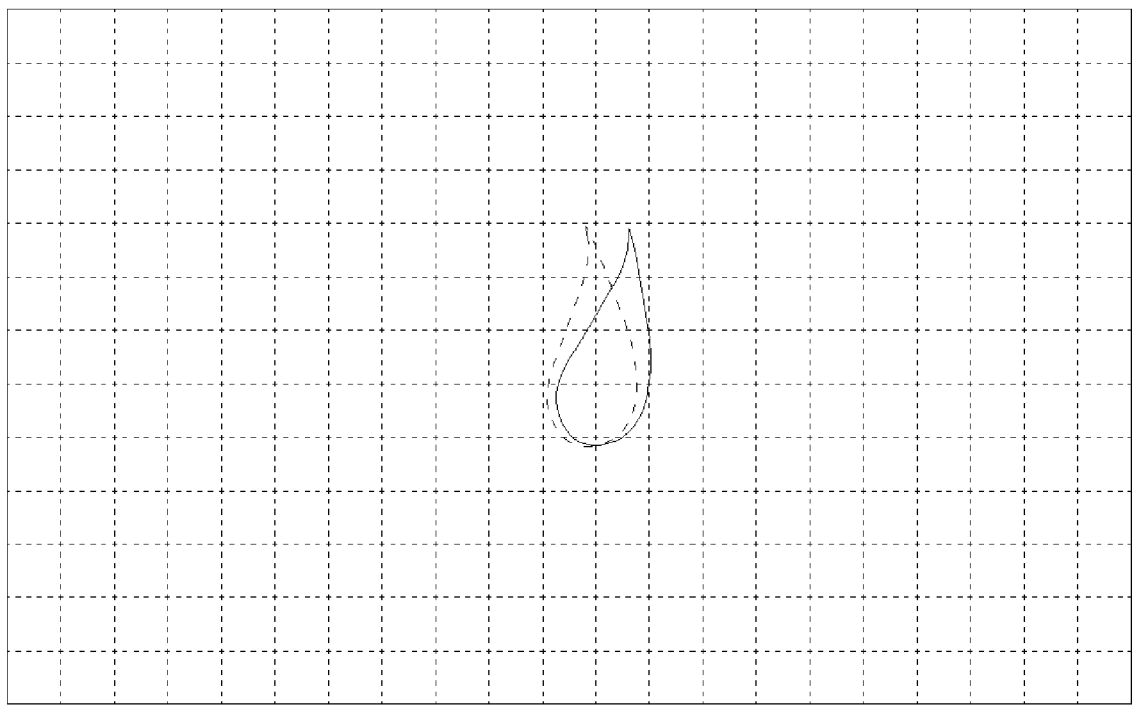

For instance, suppose that the size of flame is constant, such as a flame of a candle or a lighter. This kind of flame will not bring about a fire accident; therefore, a fire alarm is not provided. Please refer to FIG. 21 to FIG. 32. FIGS. 21, 23, and 25 show the same flame 120, 130, and 140 moving due to wind, the distance between the image capturing device 12 and the flame being d1. FIGS. 22, 24, and 26 show the numbers of fire pixels of FIGS. 21, 23, and 25, respectively. FIGS. 27, 29, and 31 show the same flame 120, 130, and 140 moving due to wind, with the separation being d2. FIGS. 28, 30, and 32 show the numbers of fire pixels of FIGS. 27, 29, and 31, respectively. The image capturing device 12 captures images in the predetermined area. If the distance is d1, the sizes of the flames 120, 130, and 140 in the frames are small. Due to the flames 120, 130, and 140 being the same, the numbers of fire pixels of the flames 120, 130, and 140 are also approximately the same. The number of fire pixels does not significantly increase when continuously capturing images. Even though the wind causes the flame to move, the number just changes within a narrow range. In this case, when the present invention detects if the flame increases, the answer is no and a fire alarm is not generated. Similarly, if the distance is d2, the sizes of the flames 120, 130, and 140 in the frames are larger. However, due to the flames 120, 130, and 140 being the same, the numbers of fire pixels of the flames 120, 130, and 140 are also the substantially the same. The number of fire pixels does not significantly increase when continuously capturing images. Even though the wind causes the flame to move, the number just changes within a narrow range. Also, when the present invention detects if the flame increases, the result is negative and a fire alarm is not generated.

Figure 33:
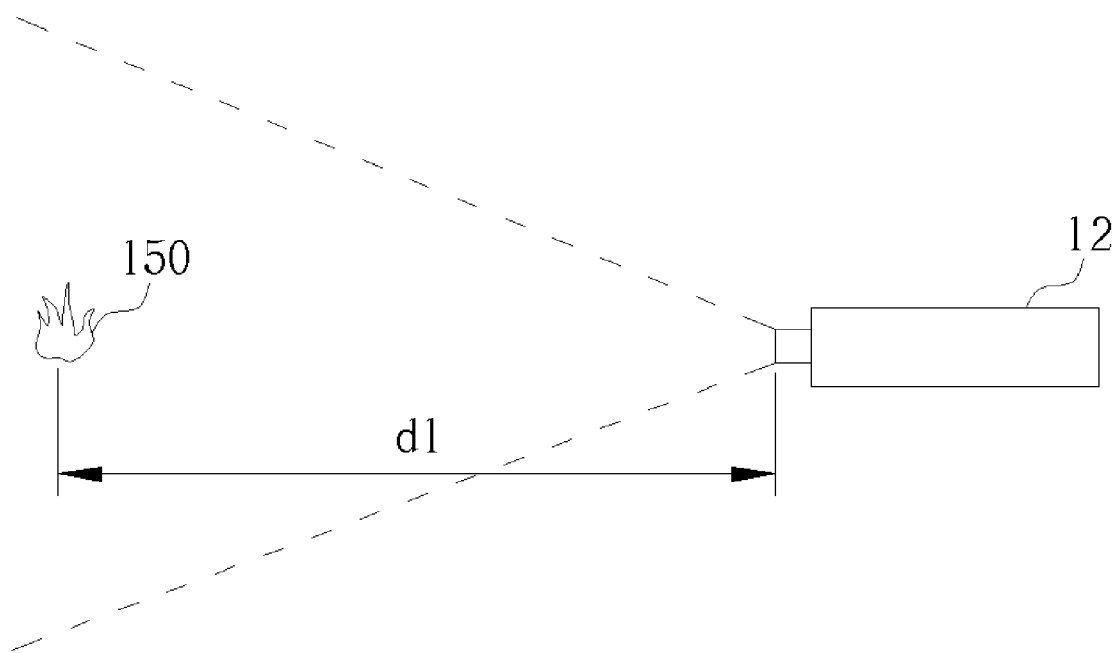
Figure 34:
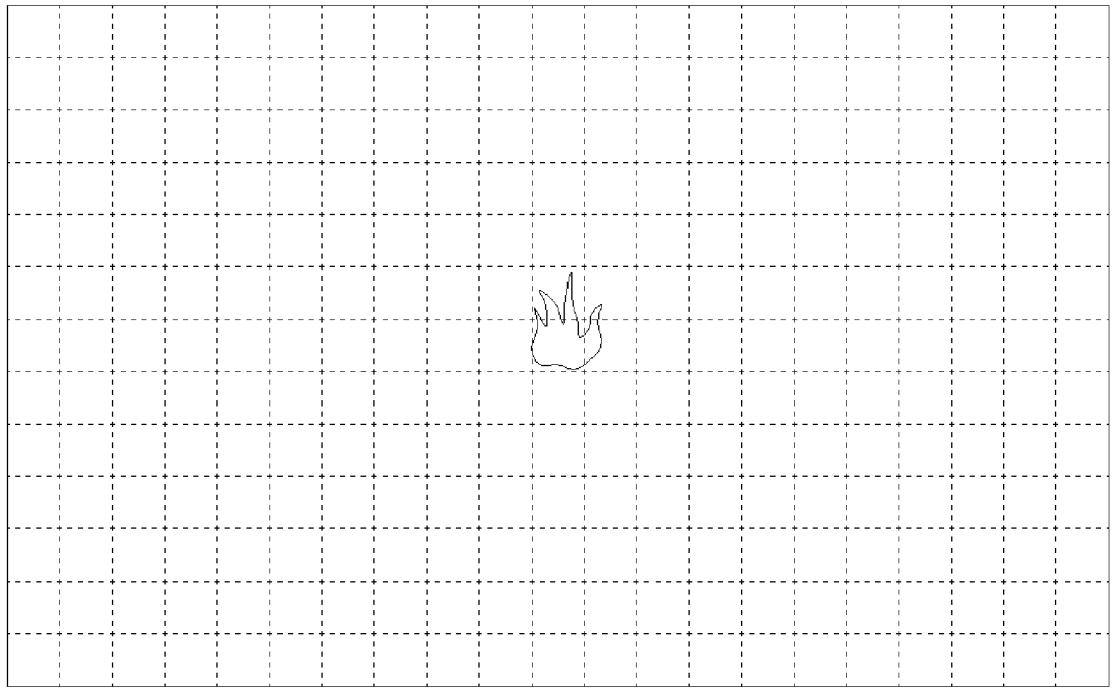
Figure 35:
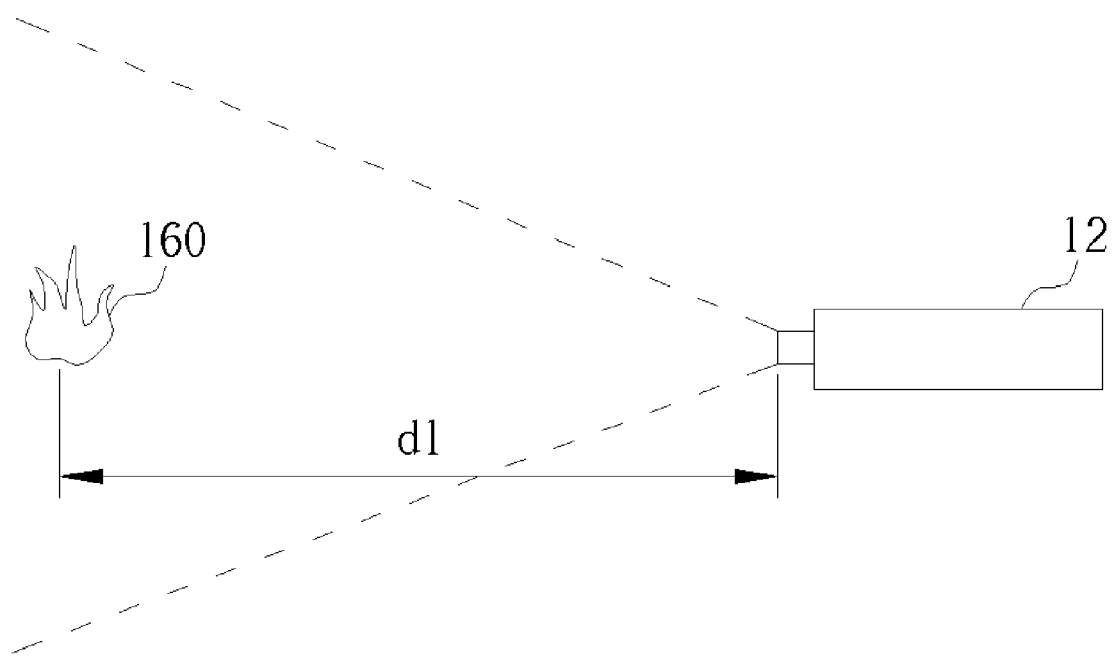
Figure 36:
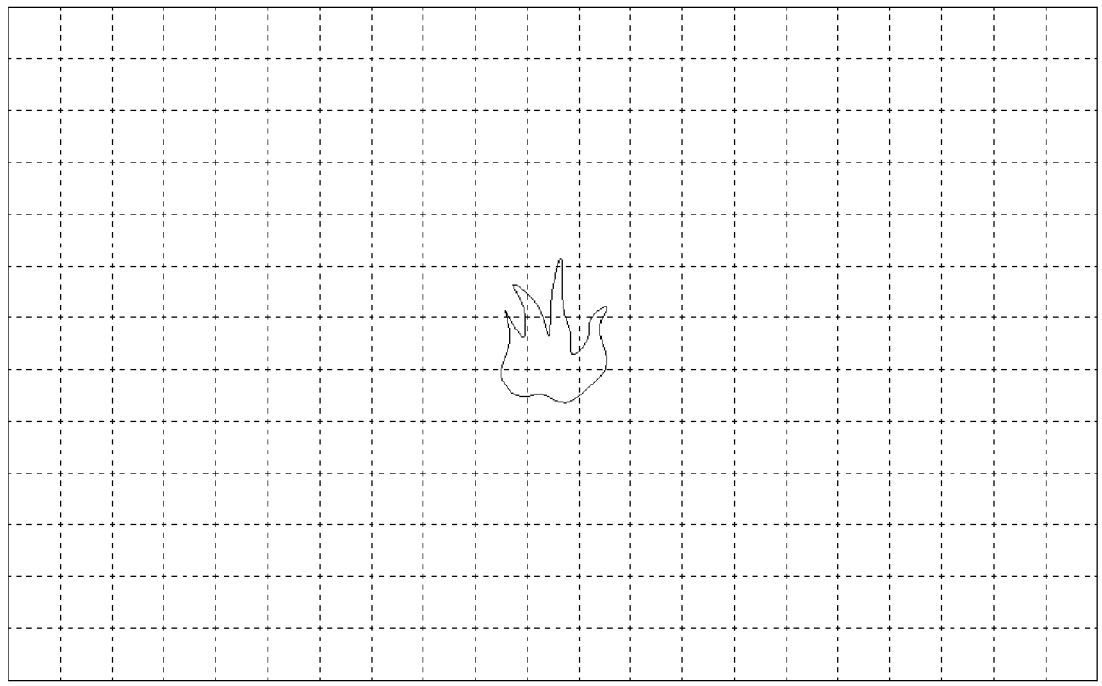
Figure 37:
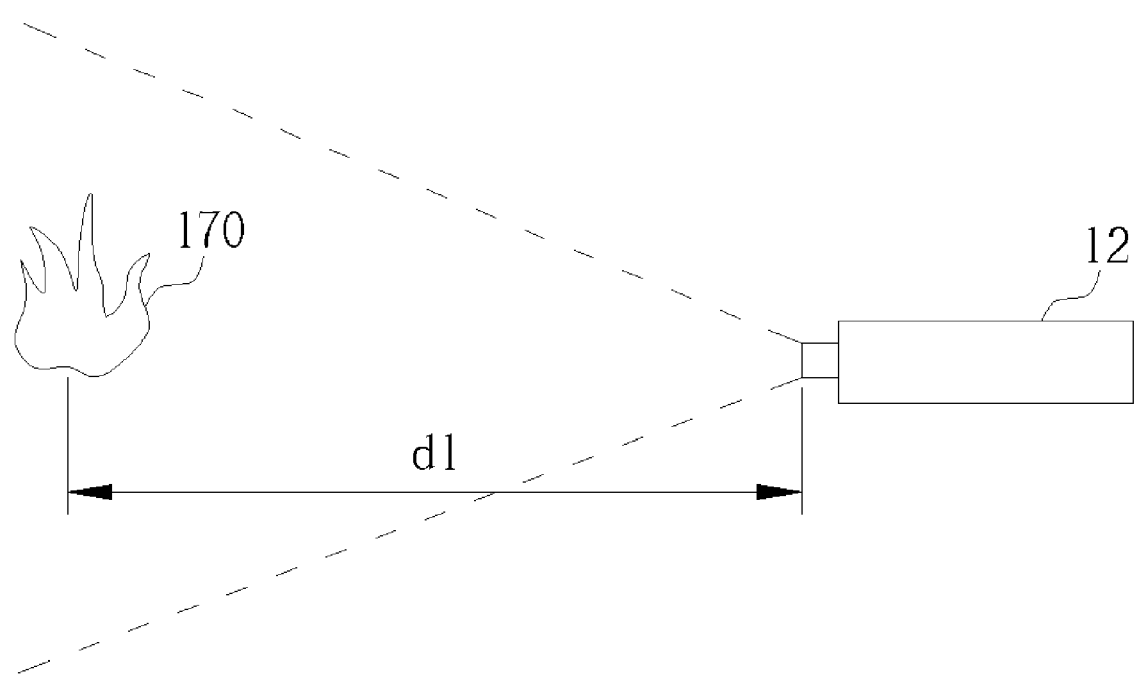
Figure 38:
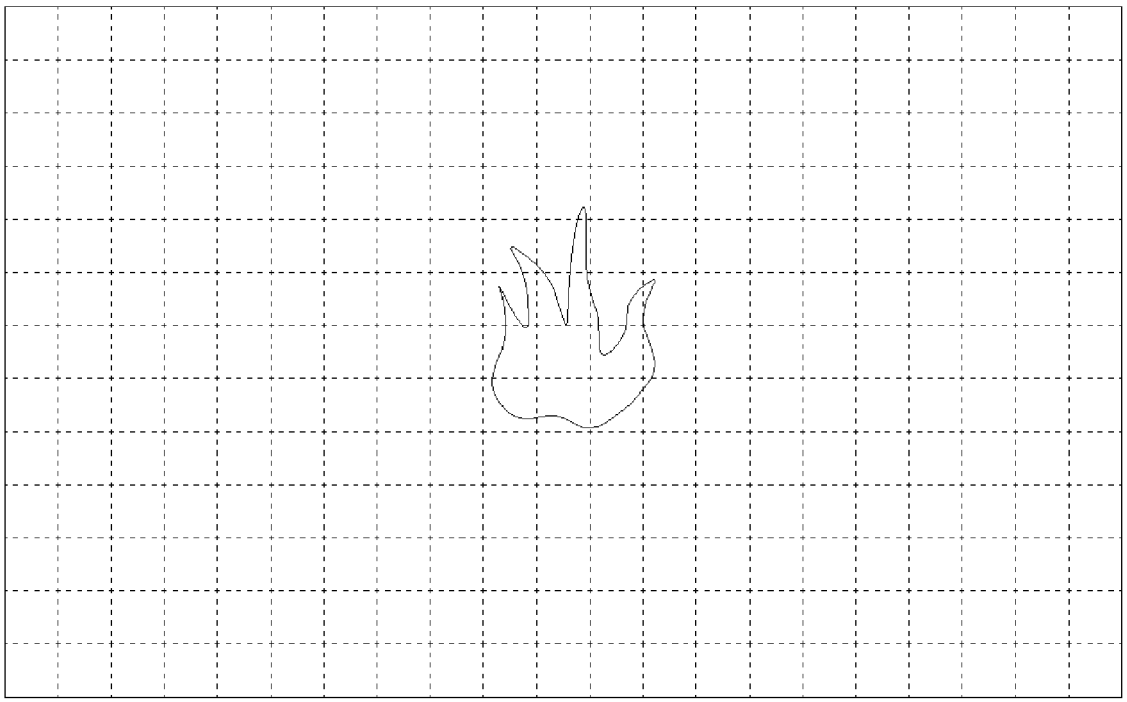
Figure 39:
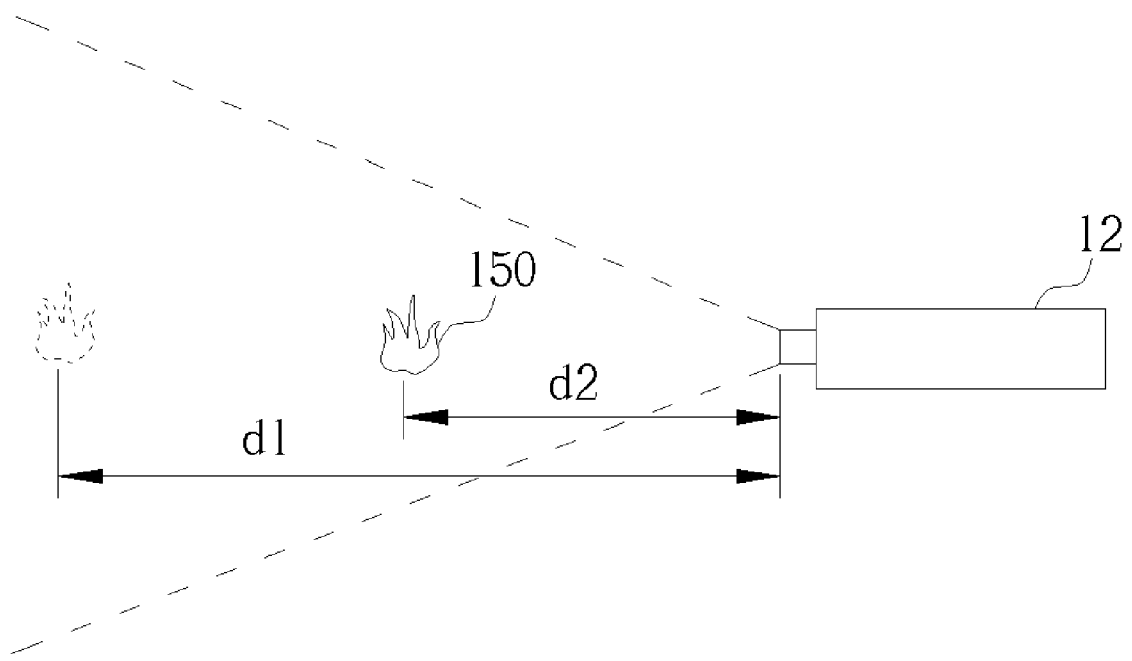
Figure 40:
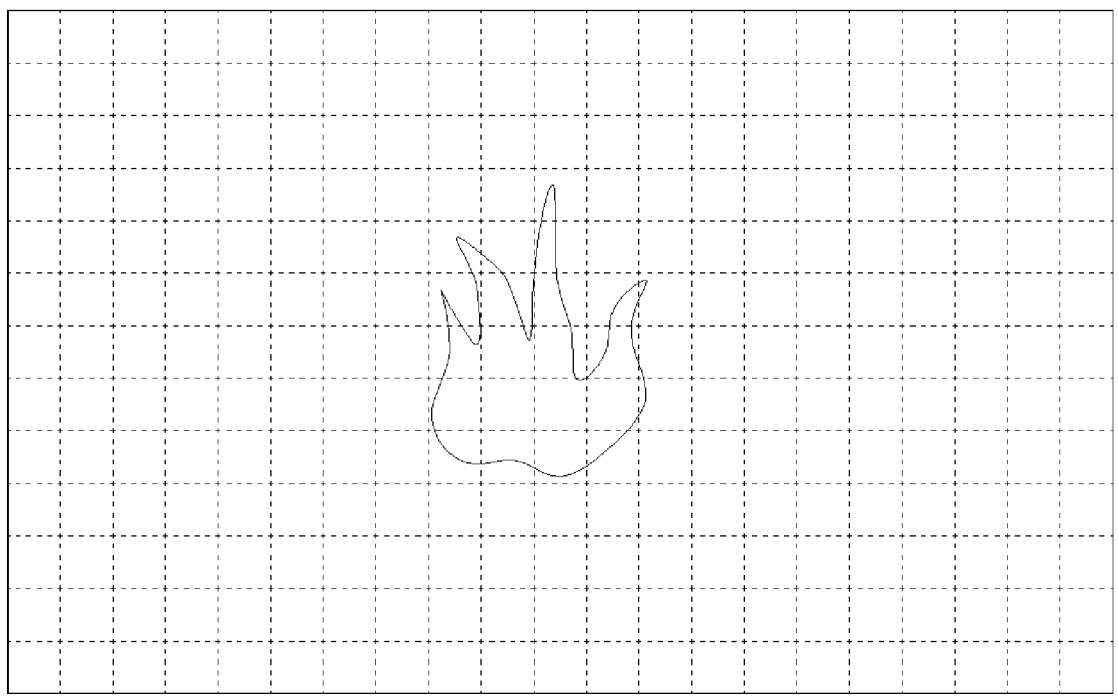
Figure 41:
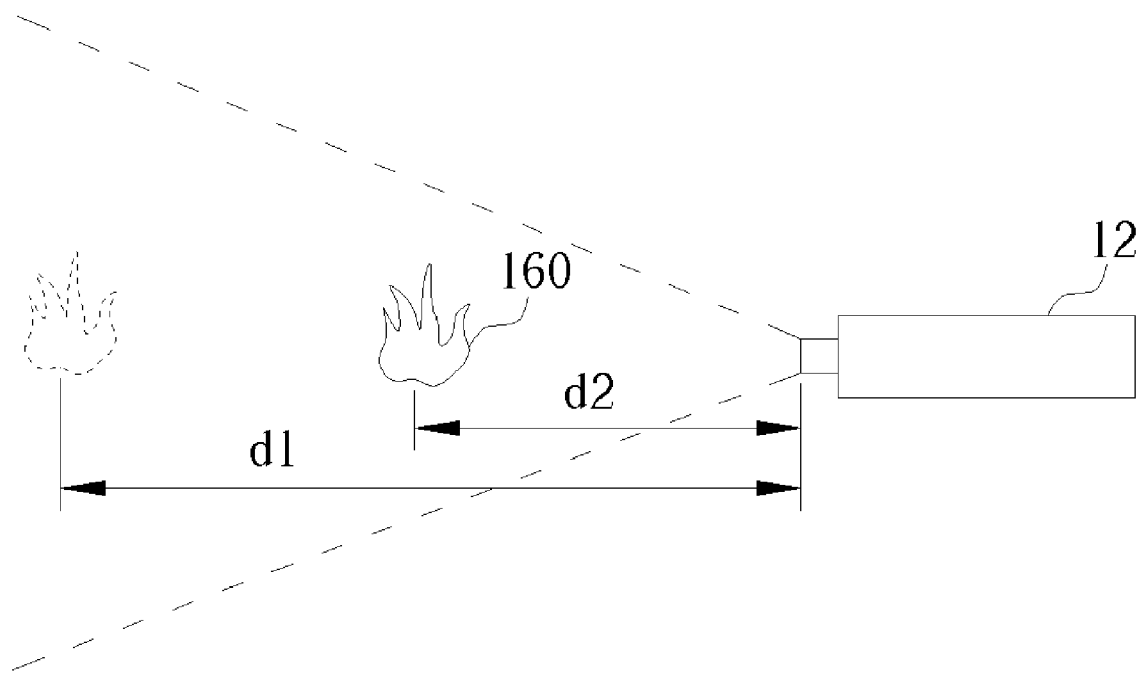
Figure 42:
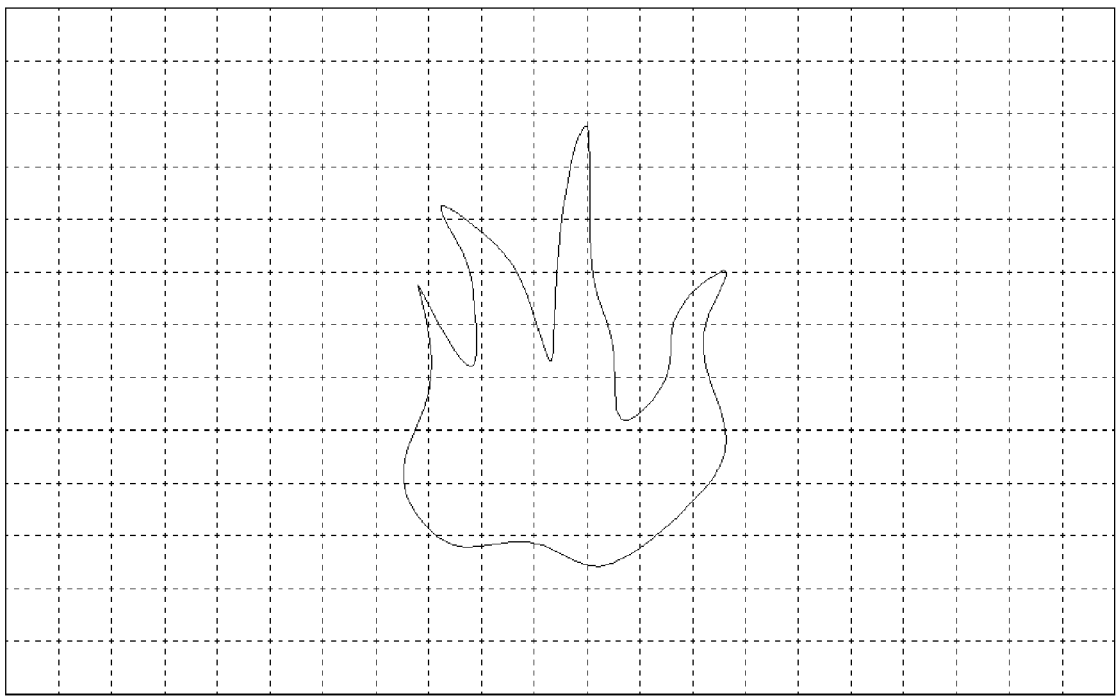
Figure 43:
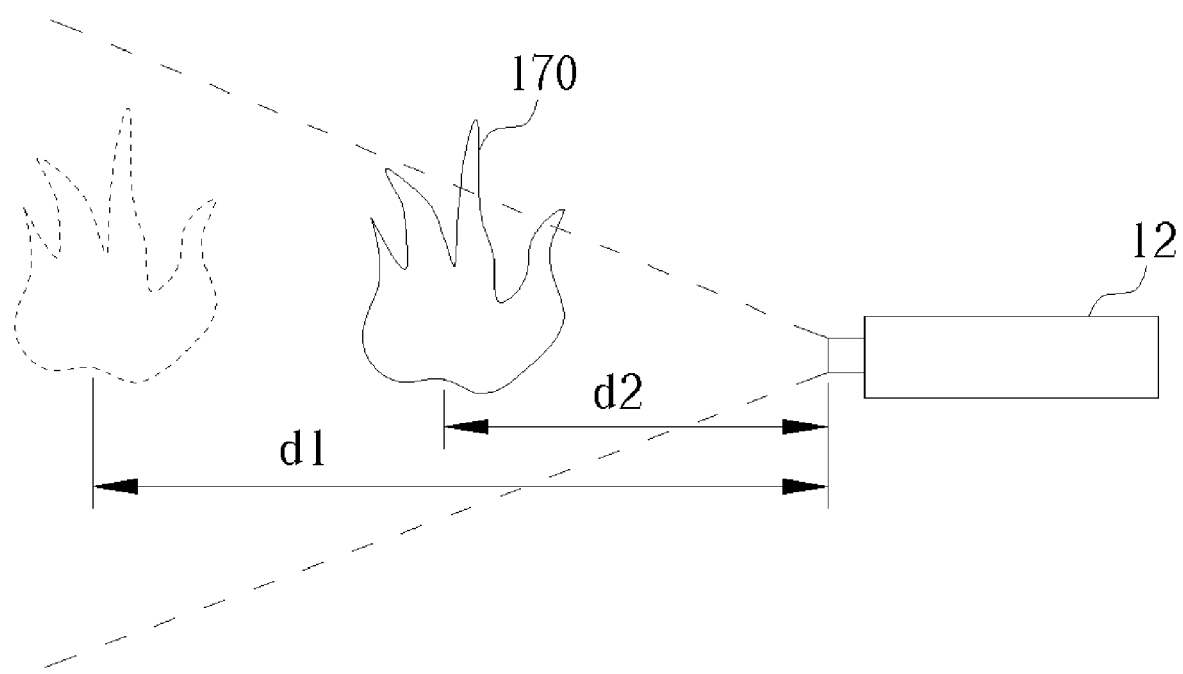
Figure 44:
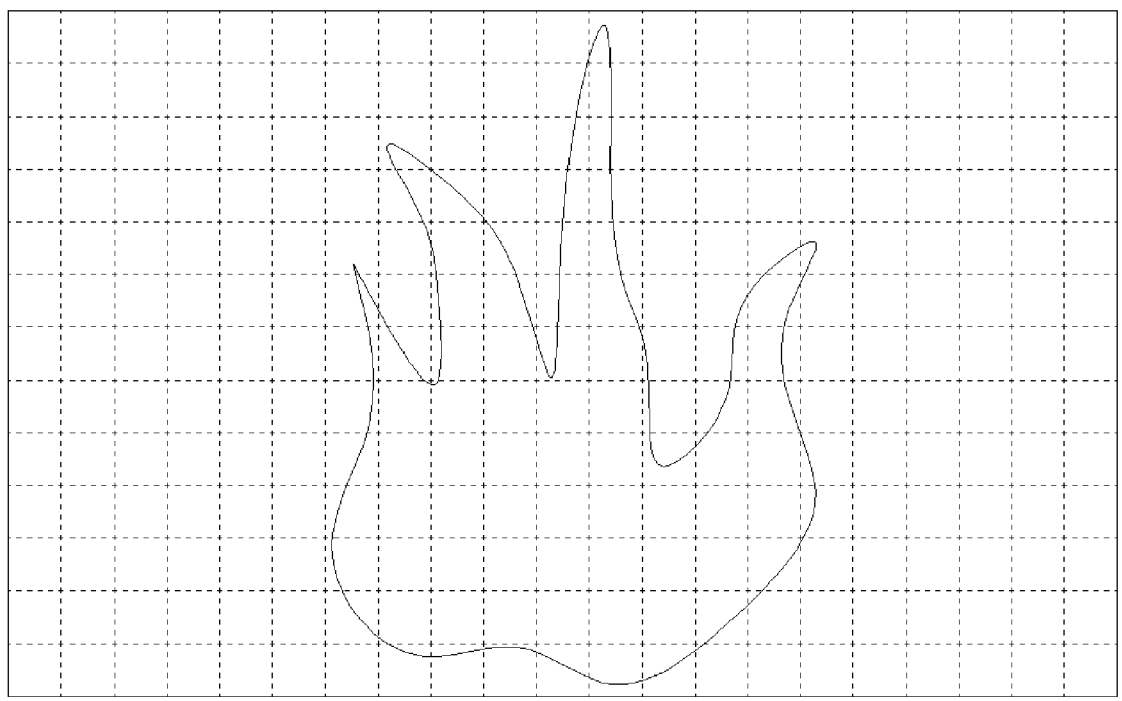

In another situation, supposing that the flame spreads out and forms a fire, the fire alarm should be generated. Please refer to FIG. 33 to FIG. 44. FIGS. 33, 35, and 37 show a flame 150 spreading out to becomes flames 160 and 170, the distance from the image capturing device 12 being the longer d1. FIGS. 34, 36, and 38 show numbers of fire pixels of FIGS. 33, 35, and 37, respectively. FIGS. 39, 41, and 43 show the same flame 150 spreading out to become flames 160 and 170, the distance from the image capturing device 12 being the shorter d2. FIGS. 40, 42, and 44 show numbers of fire pixels of FIGS. 39, 41, and 43, respectively. The image capturing device 12 only captures images in a predetermined area. Although the distance is d1, the flame spreads out. When the image capturing device 12 captures images continuously, the number of fire pixels increases gradually. In this condition, when the present invention detects if the flame increases, the result is positive and a fire alarm is generated. Similarly, even though the flames 150, 160, and 170 are near the image capturing device 12, because the flame is spreading out, the number of fire pixels increases gradually. In this situation a fire alarm is also provided.

From the examples mentioned above, the present invention efficiently reduces the false fire alarm rate.

Generally, fires are formed by inflammable substances in a combustion-supporting atmosphere at suitable temperature. Equally important, it takes a period of time to form a fire. The present invention uses the period before a fire is fully formed to repeatedly record the number of fire pixels of difference frames for detecting if a flame increases, outputting a fire alarm when significant flame increase is determined. Thus, the flame can be extinguished before forming a full-scale fire. The present invention also can efficiently reduce the false fire alarm rate to achieve efficient fire detection.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for detecting early fires in a predetermined area, the method comprising:
   (a) capturing a plurality of images of the predetermined area during an interval for generating a plurality of difference frames;
   (b) detecting a number of pixels that have fire characteristics in each difference frame by determining if each pixel of each difference frame satisfies the relationships R>Rt and R≧G>B, where R is a value of a red component of the pixel, Rt is a threshold of the red component, G is a value of a green component of the pixel, and B is a value of a blue component of the pixel; and (c) if the result of step (b) indicates that a flame in the predetermined area substantially increases during the interval, outputting an early fire alarm.

2. The method of claim 1 wherein in step (c) if the result of step (b) indicates that a ratio of spreading flame in the predetermined area is over a threshold of spreading flame during the interval, then outputting the early fire alarm.

3. The method of claim 1 wherein step (a) includes:
   comparing two images captured for generating a difference of the two images; and
   removing noise from the difference for generating a difference frame.

4. The method of claim 1 wherein determining the number of pixels that have fire characteristics in each difference frame further comprises determining if each pixel of each difference frame satisfies the relationship S≧((255−R)*St/Rt), wherein S is saturation of the pixel and St is a threshold of saturation.

5. The method of claim 4 wherein when the value of the red component of a pixel is Rt, the saturation of the pixel is St.

6. A method for detecting a number of pixels that have fire characteristics in a difference frame, the method comprising:
   determining if each pixel of the difference frame complies with the following rules:
   R>Rt;
   R≧G>B; and
   S≧((255−R)*St/Rt);
   wherein R is a value of a red component of the pixel, Rt is a threshold of the red component, G is a value of a green component of the pixel, B is a value of a blue component of the pixel, S is saturation of the pixel, and St is a threshold of saturation; and
   if a pixel complies with the above rules, adjusting the number of pixels that have fire characteristics of the difference frame.

7. The method of claim 6 wherein when the value of the red component of a pixel is Rt, the saturation of the pixel is St.

8. The method of claim 6 wherein a video detecting system captures images in a predetermined area and the difference frame is generated by removing noise of a difference of two images captured by the video detecting system.

9. A video detecting system comprising:
   an image capturing device for capturing images;
   a logic unit for performing the following steps:
   (a) controlling the image capturing device to capture a plurality of images of a predetermined area during an interval for generating a plurality of difference frames;
   (b) detecting a number of pixels that have fire characteristics in each difference frame by determining if each pixel of each difference frame satisfies the relationships R>Rt and R≧G>B, where R is a value of a red component of the pixel, Rt is a threshold of the red component, G is a value of a green component of the pixel, and B is a value of a blue component of the pixel; and
   (c) if the result of step (b) indicates that a flame in the predetermined area substantially increases during the interval, outputting an early fire alarm.

10. The video detecting system of claim 9 wherein if the result of step (b) indicates that a ratio of spreading flame in the predetermined area is over a threshold of spreading flame during the interval, the logic unit outputs the early fire alarm.

11. The video detecting system of claim 9 wherein step (a) performed by the logic unit includes:
    comparing two images captured for generating a difference of the two images; and
    removing noise from the difference for generating a difference frame.

12. The video detecting system of claim 9 wherein the logic unit is a program code.

13. The video detecting system of claim 9 wherein determining the number of pixels that have fire characteristics in each difference frame further comprises determining if each pixel of each difference frame satisfies the relationship S≧((255−R)*St/Rt), wherein S is saturation of the pixel and St is a threshold of saturation.

14. The video detecting system of claim 13 wherein when the value of the red component of a pixel is Rt, the saturation of the pixel is St.

15. A video detecting system comprising:
    an image capturing device for capturing images;
    a logic unit for performing the following steps:
    (a) determining if pixels of difference frames complies with the following rules, the difference frames generated from images captured by the video detecting system:
    R>Rt;
    R≧G>B; and
    S≧((255−R)*St/Rt);
    wherein R is a value of a red component of the pixel, Rt is a threshold of the red component, G is a value of a green component of the pixel, B is a value of a blue component of the pixel, S is saturation of the pixel, and St is a threshold of saturation; and
    (b) if a pixel complies with the above rules, adjusting a number of pixels that have fire characteristics of the difference frame.

16. The video detecting system of claim 15 wherein when the value of the red component of a pixel is Rt, the saturation of the pixel is St.

17. The video detecting system of claim 15 wherein step (a) performed by the logic unit includes:
    comparing two images captured for generating a difference of the two images; and
    removing noise from the difference for generating a difference frame.

18. The video detecting system of claim 15 wherein the logic unit is a program code.

* * * * *